(12) United States Patent
Nagamine et al.

(10) Patent No.: US 10,263,477 B2
(45) Date of Patent: Apr. 16, 2019

(54) POWER TRANSMITTING APPARATUS, POWER RECEIVING APPARATUS, CONTROL METHODS THEREFOR, AND NON-TRANSITORY COMPUTER-READABLE STORAGE MEDIUM

(71) Applicant: CANON KABUSHIKI KAISHA, Tokyo (JP)

(72) Inventors: Kazuhide Nagamine, Kawasaki (JP); Tomoaki Hokyo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 824 days.

(21) Appl. No.: 14/493,339

(22) Filed: Sep. 22, 2014

(65) Prior Publication Data

US 2015/0091386 A1 Apr. 2, 2015

(30) Foreign Application Priority Data

Oct. 1, 2013 (JP) .................................. 2013-206810

(51) Int. Cl.
*H02J 5/00* (2016.01)
*H02J 50/40* (2016.01)
*H02J 50/80* (2016.01)
*H02J 7/00* (2006.01)
*H02J 7/02* (2016.01)

(52) U.S. Cl.
CPC .............. *H02J 50/40* (2016.02); *H02J 5/005* (2013.01); *H02J 7/0042* (2013.01); *H02J 7/025* (2013.01); *H02J 50/80* (2016.02)

(58) Field of Classification Search
CPC .. H02J 1/14; H02J 5/005; H02J 7/0063; H02J 7/025; H02J 17/00; H01F 38/14; H04B 5/0025–5/0093; B60L 11/182; B60L 11/1829–11/1831; Y02T 90/122
USPC .......................................... 307/104; 320/108
See application file for complete search history.

(56) References Cited

U.S. PATENT DOCUMENTS

| 8,143,745 B2 | 3/2012 | Shiozaki et al. |
| 8,299,652 B2 | 10/2012 | Sample et al. |
| 8,830,036 B2 | 9/2014 | Park et al. |

(Continued)

FOREIGN PATENT DOCUMENTS

| JP | 2006-031259 A | 2/2006 |
| JP | 2010-28937 | 2/2010 |

(Continued)

OTHER PUBLICATIONS

U.S. Appl. No. 14/907,972, filed Jan. 27, 2016. Applicant: Kazuhide Nagamine.

(Continued)

*Primary Examiner* — Rexford N Barnie
*Assistant Examiner* — Terrence Willoughby
(74) *Attorney, Agent, or Firm* — Venable LLP

(57) ABSTRACT

A power transmitting apparatus supporting a plurality of wireless power transmission methods, acquires information about at least one wireless power transmission method supported by a power receiving apparatus from the power receiving apparatus, decides, based on the acquired information, a wireless power transmission method to be used for power transmission to the power receiving apparatus, and transmits power to the power receiving apparatus by the decided wireless power transmission method.

17 Claims, 13 Drawing Sheets

(56) References Cited

U.S. PATENT DOCUMENTS

| | | | |
|---|---|---|---|
| 8,892,033 B2 | 11/2014 | Terada et al. | |
| 9,142,999 B2 | 9/2015 | Von Novak | |
| 9,407,327 B2 | 8/2016 | Kirby et al. | |
| 9,444,289 B2 | 9/2016 | Park et al. | |
| 9,461,712 B2 | 10/2016 | Miyabayashi et al. | |
| 9,692,251 B2 | 6/2017 | Sever et al. | |
| 9,705,338 B2 | 7/2017 | Kanno | |
| 9,722,540 B2 | 8/2017 | Lee | |
| 9,837,846 B2 | 12/2017 | Partovi | |
| 9,870,859 B2 | 1/2018 | Weber | |
| 10,038,339 B2 | 7/2018 | Sankar | |
| 2011/0080051 A1 | 4/2011 | Lee et al. | |
| 2013/0057078 A1 | 3/2013 | Lee et al. | |
| 2013/0093388 A1* | 4/2013 | Partovi | H01F 5/003 320/108 |
| 2013/0221915 A1* | 8/2013 | Son | H02J 7/025 320/108 |
| 2014/0183964 A1* | 7/2014 | Walley | H04B 5/0075 307/104 |
| 2015/0091386 A1 | 4/2015 | Nagamine et al. | |

FOREIGN PATENT DOCUMENTS

| | | |
|---|---|---|
| JP | 2010-268665 A | 11/2010 |
| JP | 2011-120361 A | 6/2011 |
| JP | 2011-244683 A | 12/2011 |
| JP | 2012-125112 A | 6/2012 |
| JP | 2012-518381 | 8/2012 |
| JP | 2012-175798 A | 9/2012 |
| JP | 2012-239360 A | 12/2012 |
| WO | 2012/169861 A | 12/2012 |

OTHER PUBLICATIONS http://ja.idt.com/about/press-room/idt-announces-industry%E2%80%99s-first-dual-mode-wireless-power-receiver-ic-compatible-both-wpc-and-pma-stan, Apr. 24, 2014, discussed at paragraph [0002] of the specification.

Japanese Office Action dated Jun. 16, 2017 in Japanese Application No. 2013206810.

Notice of Allowance dated Sep. 5, 2017 in U.S. Appl. No. 14/907,972.

Chinese Office Action dated Sep. 4, 2017 in Chinese Application No. 201480054133.5.

Japanese Office Action dated Apr. 2, 2018 in Japanese Application No. 2017-133042, which is a foreign counterpart to related U.S. Appl. No. 14/907,972.

Japanese Office Action dated Jan. 26, 2018 in Japanese Application No. 2017-133042, which is a foreign counterpart to related U.S. Appl. No. 14/907,972.

* cited by examiner

F I G. 9
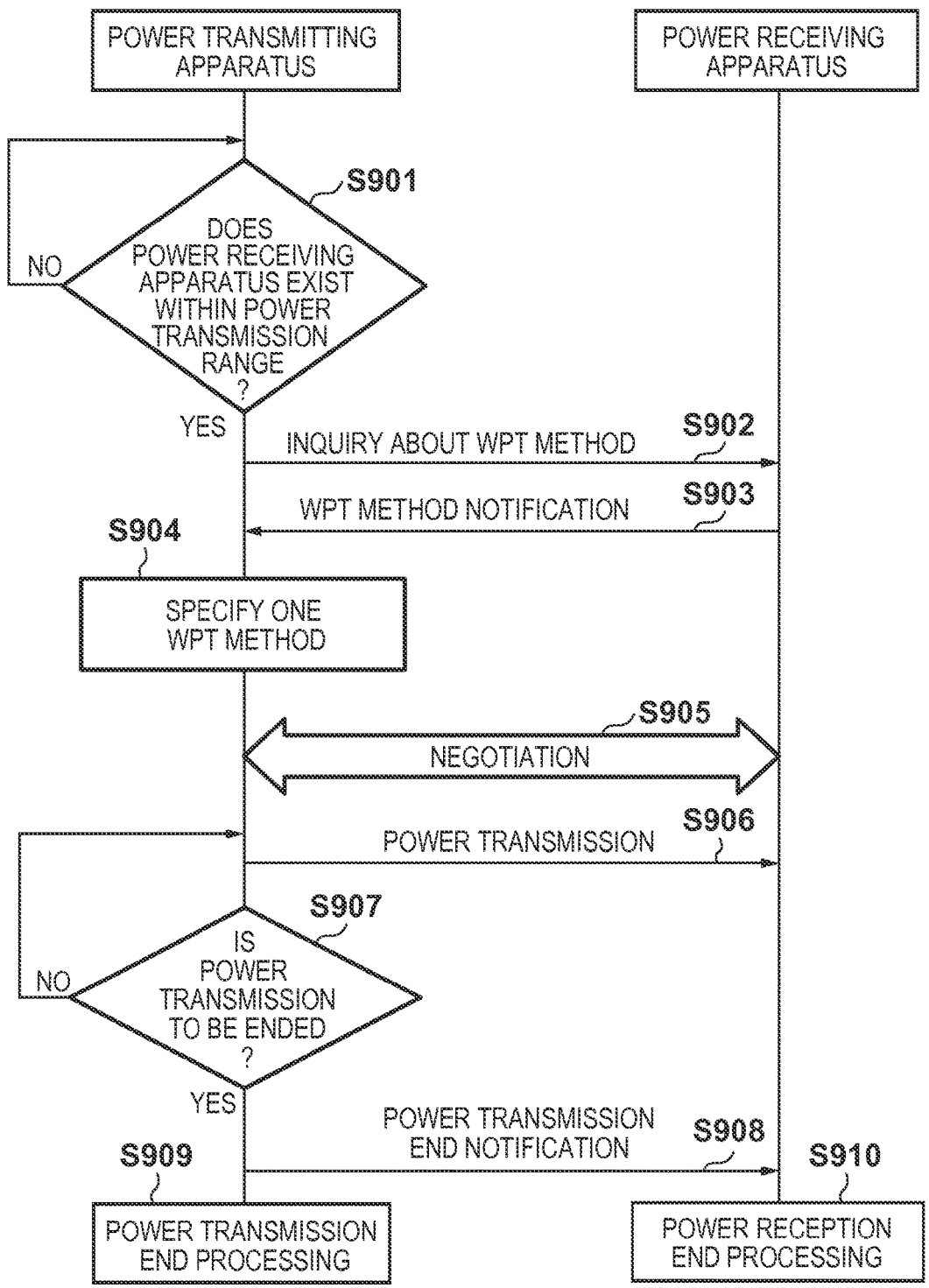

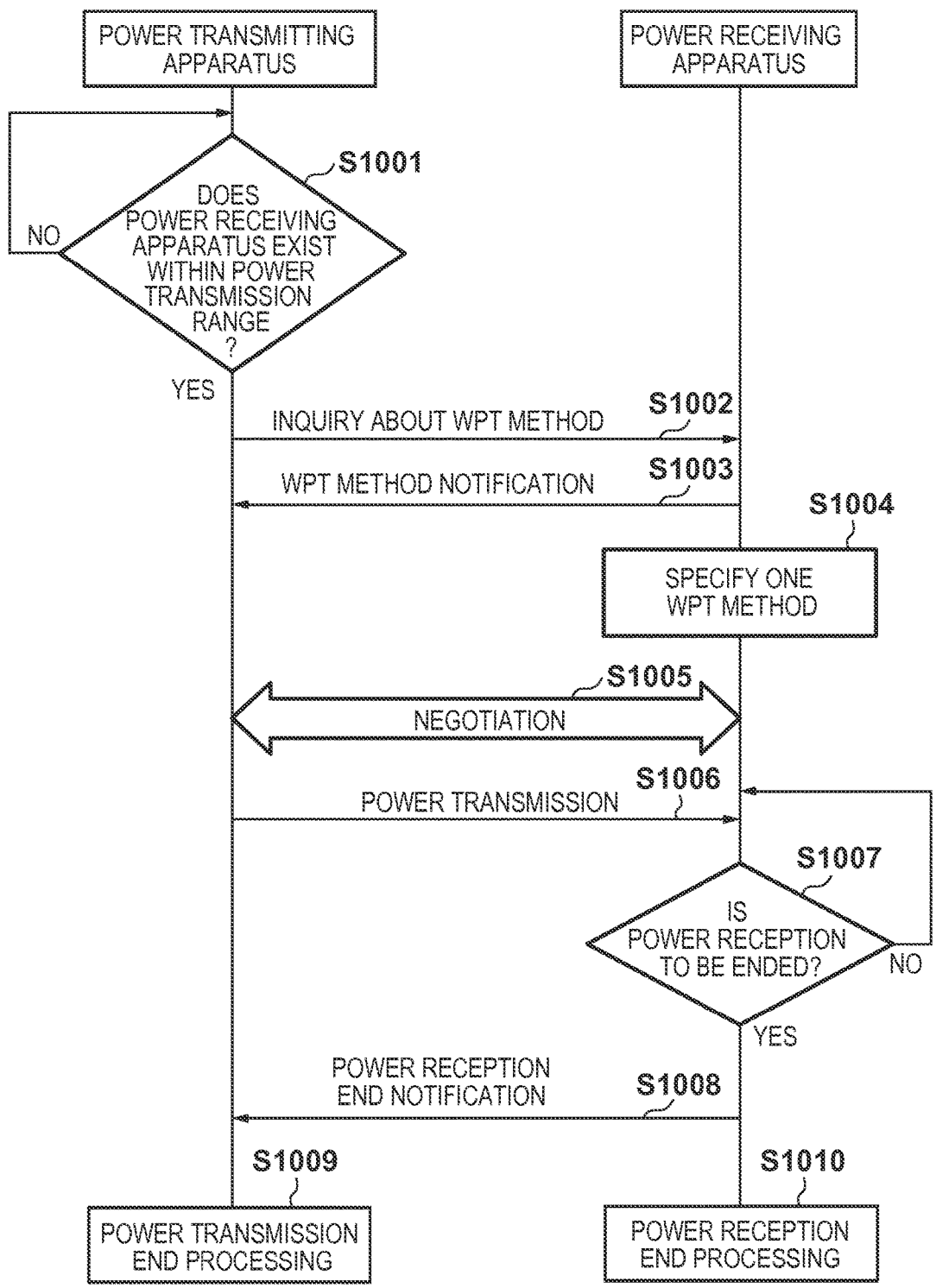

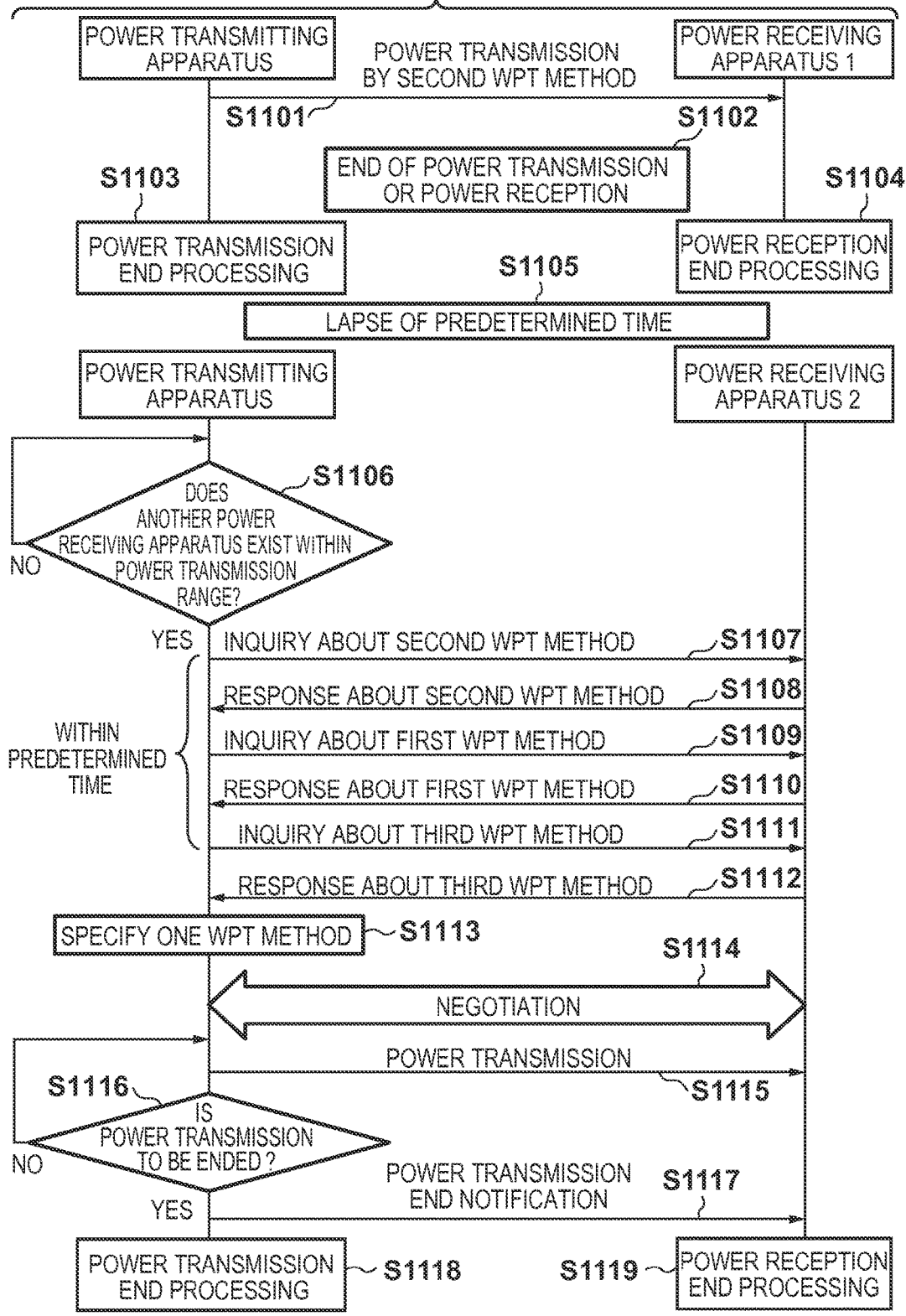

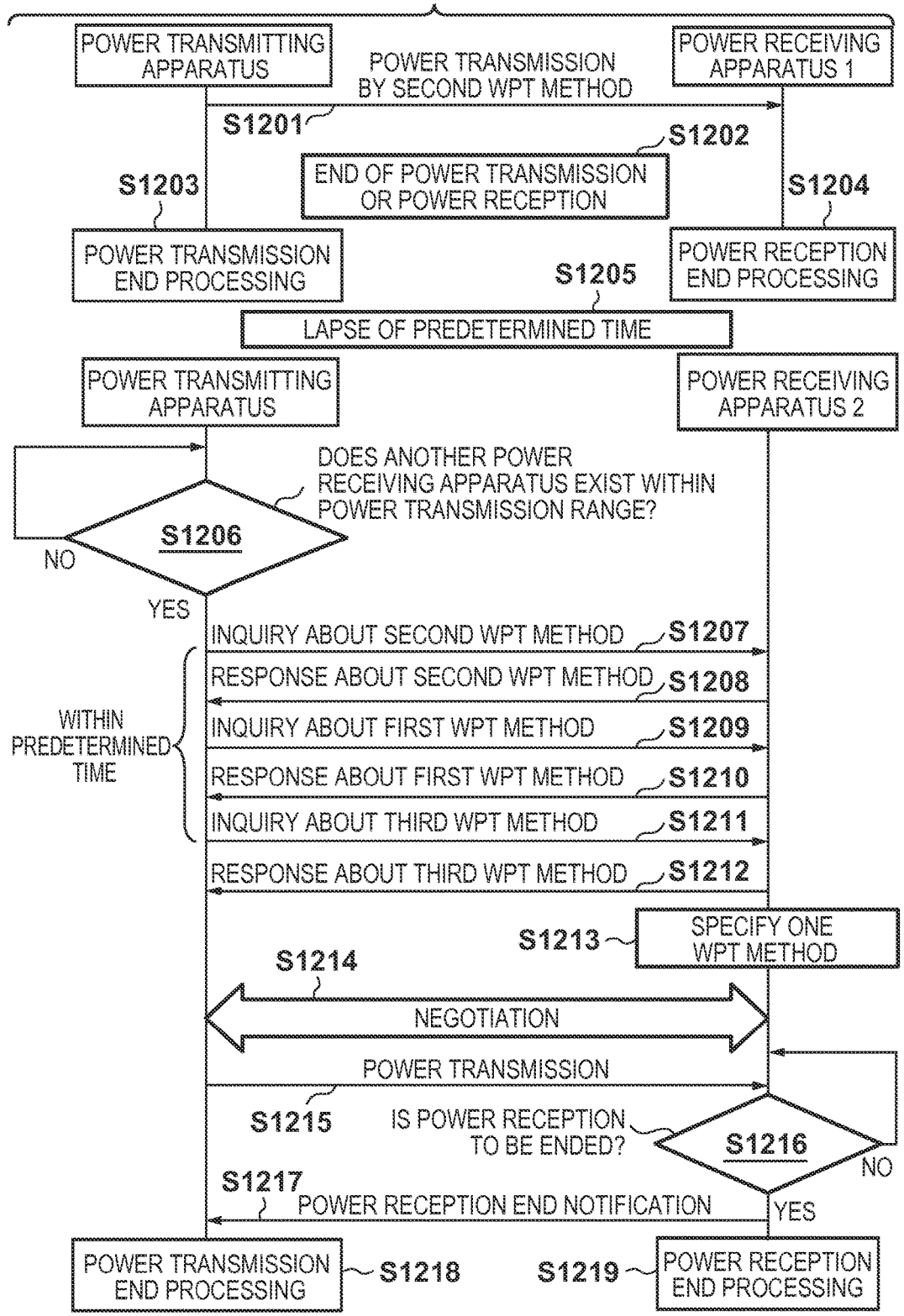

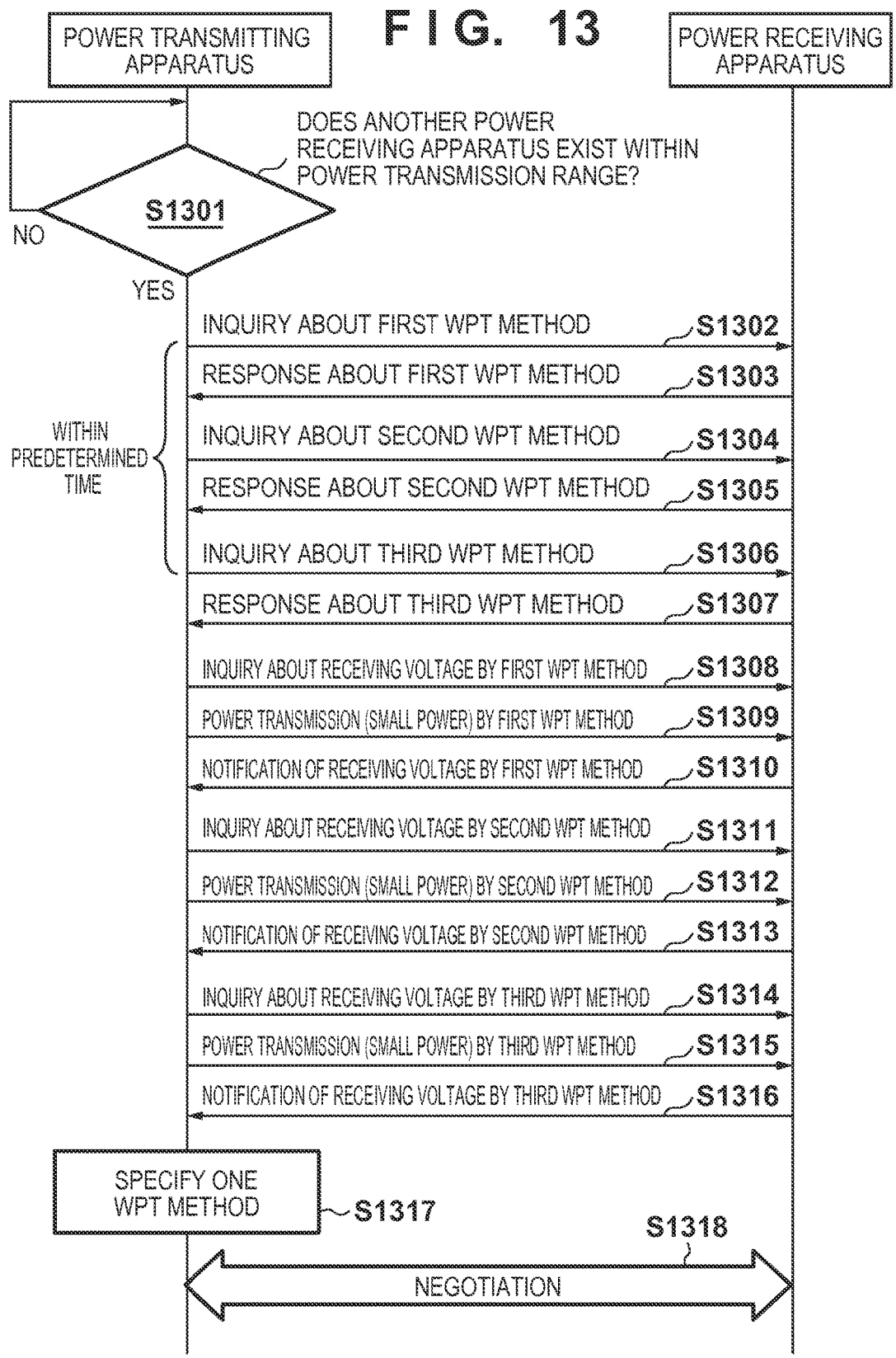

POWER TRANSMITTING APPARATUS, POWER RECEIVING APPARATUS, CONTROL METHODS THEREFOR, AND NON-TRANSITORY COMPUTER-READABLE STORAGE MEDIUM

BACKGROUND OF THE INVENTION

Field of the Invention

The present invention relates to a power transmitting apparatus, power receiving apparatus, control methods therefor, and non-transitory computer-readable storage medium for wireless power transmission.

Description of the Related Art

At present, there are known various methods for performing wireless power transmission, such as a electromagnetic induction method and magnetic resonance method. There exist a plurality of standards for ensuring mutual connectivity between a power transmitting apparatus and a power receiving apparatus in a wireless power transmission system. The web site, http://ja.idt.com/about/press-room/idt-announces-industry%E2%80%99s-first-dual-mode-wireless-power-receiver-ic-compatible-both-wpc-and-pma-stan describes an IC chip supporting a plurality of standards about wireless power transmission.

In a system supporting a plurality of wireless power transmission methods (WPT methods), the efficiency of wireless power transmission may decrease depending on a wireless power transmission method used for power transmission. For example, a case in which a power transmitting apparatus supports the first WPT method (the upper limit of transmission power is 5 W) and the second WPT method (the upper limit of transmission power is 10 W) will be described. In this case, if the power transmitting apparatus transmits, by the first WPT method, a power of 5 W to a power receiving apparatus (supporting the first and second WPT methods) that has been placed first on a charging stand in the power transmitting apparatus, it may be impossible to charge a power receiving apparatus supporting only the first WPT method during power transmission to the power receiving apparatus.

SUMMARY OF THE INVENTION

The present invention has been made to solve the above-described problem, and improves the efficiency of wireless power transmission in a system supporting a plurality of wireless power transmission methods.

According to one aspect of the present invention, there is provided a power transmitting apparatus supporting a plurality of wireless power transmission methods, comprising: an acquisition unit configured to acquire information about at least one wireless power transmission method supported by a power receiving apparatus from the power receiving apparatus; a decision unit configured to decide, based on the information acquired by the acquisition unit, a wireless power transmission method to be used for power transmission to the power receiving apparatus; and a power transmitting unit configured to transmit power to the power receiving apparatus by the wireless power transmission method decided by the decision unit.

Further features of the present invention will become apparent from the following description of exemplary embodiments (with reference to the attached drawings).

BRIEF DESCRIPTION OF THE DRAWINGS

FIG. 9 is a sequence chart for explaining the operation of the power transmitting apparatus 101 and power receiving apparatus 103 according to the first embodiment;

FIG. 10 is a sequence chart for explaining the operation of the power transmitting apparatus 101 and power receiving apparatus 103 according to the second embodiment;

FIG. 11 is a sequence chart for explaining the operation of a power transmitting apparatus 101 and power receiving apparatuses 103 according to the third embodiment;

FIG. 12 is a sequence chart for explaining the operation of the power transmitting apparatus 101 and power receiving apparatuses 103 according to the third embodiment; and FIG. 13 is a sequence chart for explaining selection of a WPT method based on the power transmission efficiency.

DESCRIPTION OF THE EMBODIMENTS

The present invention will be described in detail below with reference to the accompanying drawings. Note that arrangements shown in the following embodiments are merely examples, and the present invention is not limited to the illustrated arrangements.

<First Embodiment>

Figure 1:
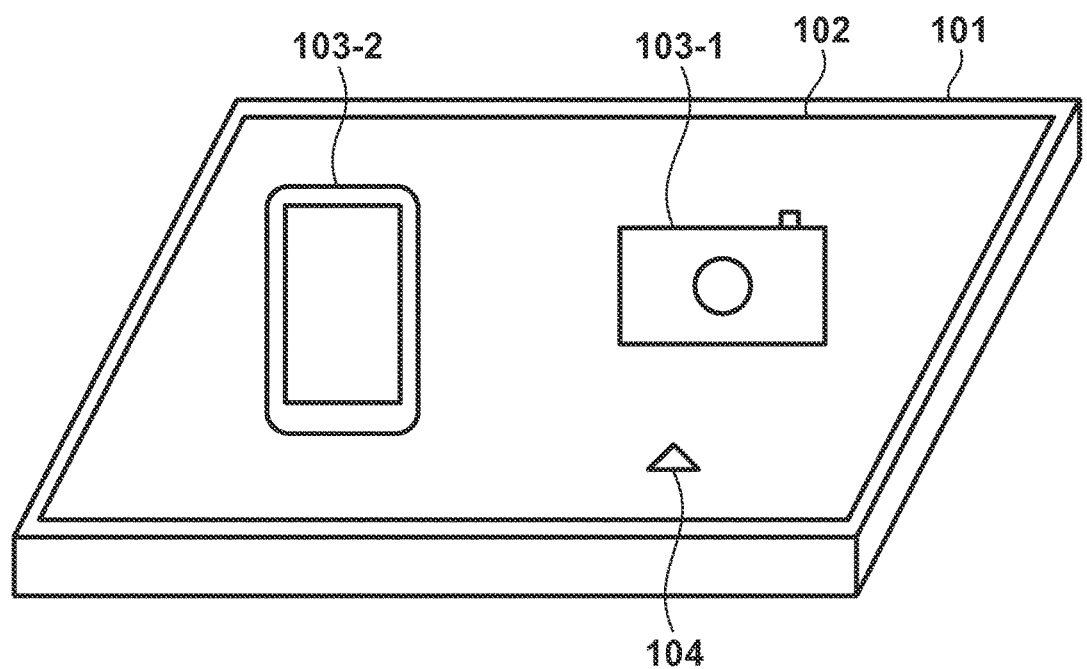
FIG. 1 is a schematic view for explaining some embodiments.

FIG. 1 is a schematic view for explaining an example of the use scene of the embodiment. As shown in FIG. 1, a plurality of power receiving apparatuses 103 (power receiving apparatuses 103-1 and 103-2) exist within a power transmission range 102 of a power transmitting apparatus 101. Note that the power transmitting apparatus 101 can be set in an electric appliance such as a notebook PC, DVD recorder, or video recorder, or furniture such as a table, desk, or television stand. A case in which the power receiving apparatuses 103 are a digital camera and smart phone will be explained with reference to FIG. 1. However, the present invention is also applicable to various electric appliances such as a video camera, notebook PC, and feature phone. Each power receiving apparatus 103 is capable of receiving power wirelessly transmitted from the power transmitting apparatus 101. Each power receiving apparatus 103 can charge a battery or drive an apparatus using the received power.

In this embodiment, a case in which the power transmitting apparatus 101 supports three wireless power transmission methods (WPT methods) shown in Table 1 will be explained. Note that the present invention is not limited to this, and the power transmitting apparatus 101 can support a plurality of WPT methods. Furthermore, in this embodiment, a case in which the power transmitting apparatus 101 decides one of the supported three WPT methods to be used for power transmission to each power receiving apparatus 103 will be described.

TABLE 1

| method number | control communication for power transmission | enabling/disabling of power transmission to plural power receiving apparatuses | amount of transmissible power (total value) |
| --- | --- | --- | --- |
| 1 | load modulation | disabled (up to one) | 5 W |
| 2 | Bluetooth | enabled (up to three) | 20 W |
| 3 | IEEE802.11n | enabled (up to 10) | 50 W |

In Table 1, the control communication method for power transmission as the first WPT method is load modulation, the control communication method for power transmission as the second WPT method is Bluetooth®, and the control communication method for power transmission as the third WPT method is IEEE802.11n. The communicable distances of IEEE802.11n and Bluetooth are longer than that of load modulation.

Note that although FIG. 1 shows a case in which the two power receiving apparatuses 103 exist within the power transmission range, three or more power receiving apparatuses 103 can be arranged within the power transmission range 102. The power transmitting apparatus 101 of this embodiment can perform wireless power transmission to the plurality of power receiving apparatuses 103 existing within the power transmission range.

Figure 2:
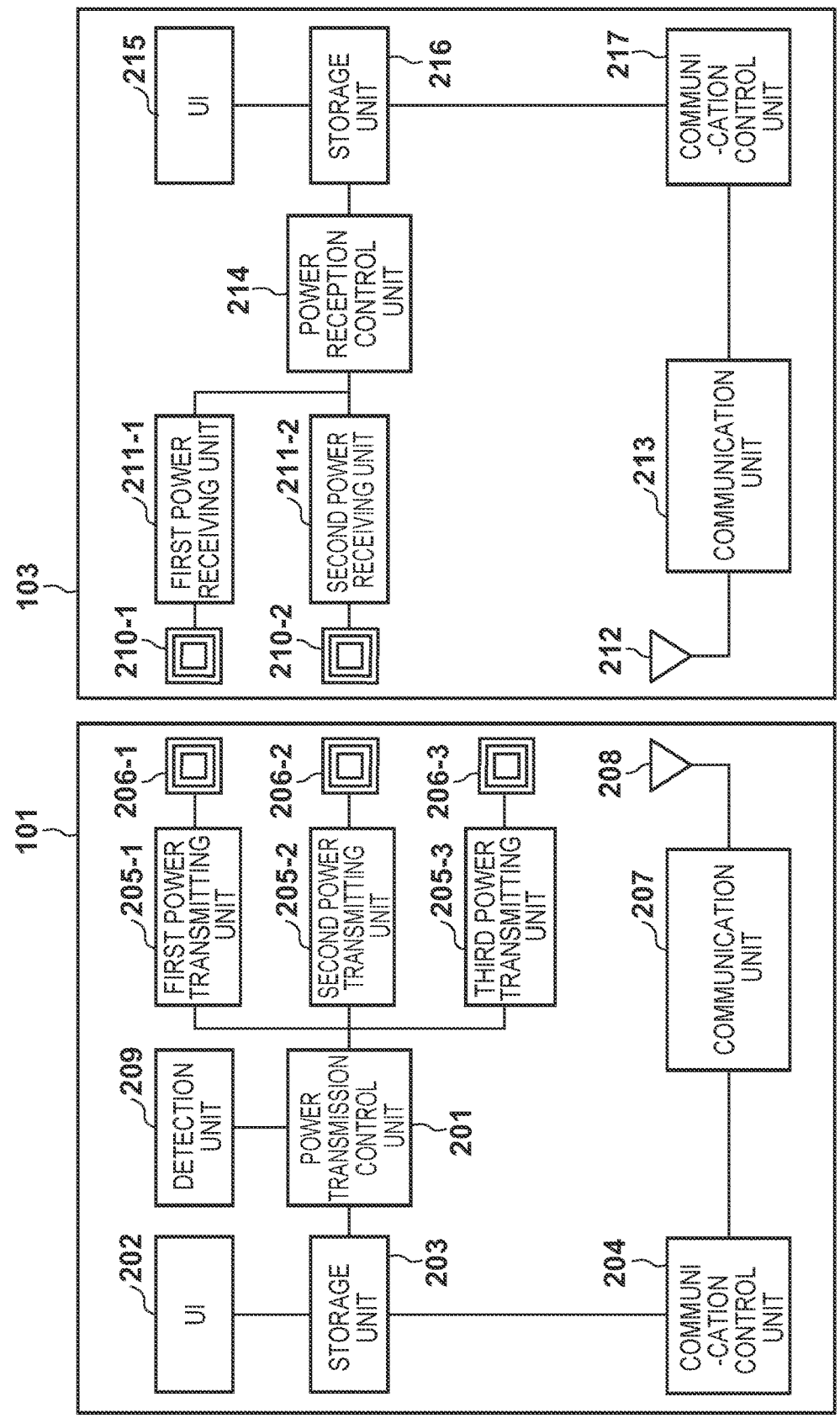
FIG. 2 is a block diagram showing an example of the functional arrangement of a power transmitting apparatus 101 and power receiving apparatus 103 according to some embodiments.

The arrangement of the power transmitting apparatus 101 and each power receiving apparatus 103 according to this embodiment will be described with reference to FIG. 2. FIG. 2 is a block diagram for explaining the functional arrangement of the power transmitting apparatus 101 and each power receiving apparatus 103. The power transmitting apparatus 101 is configured to include a power transmission control unit 201, a UI (User Interface) 202, a storage unit 203, a communication control unit 204, a plurality of power transmitting units 205, a plurality of power transmitting antennas 206, a communication unit 207, a communication antenna 208, and a detection unit 209. In this embodiment, the different power transmitting units 205 and power transmitting antennas 206 exist for the respective WPT methods. However, a plurality of WPT methods may share one power transmitting unit 205 and one power transmitting antenna 206.

The power transmission control unit 201 decides one of the plurality of wireless power transmission methods (WPT methods) supported by the power transmitting apparatus 101 to be used to transmit power to the power receiving apparatus 103 within the power transmission range. An overview of the WPT methods supported by the power transmitting apparatus 101 of this embodiment is as shown in Table 1 described above. A method of deciding a WPT method by the power transmission control unit 201 will be described later. The UI 202 serves as an interface used by the user to make various settings in the power transmitting apparatus 101. The storage unit 203 stores, for example, various kinds of information to be used by the power transmission control unit 201 to decide a WPT method. The information stored in the storage unit 203 will be described later.

The communication control unit 204 controls the communication unit 207 to implement communication with the power receiving apparatus 103. The communication unit 207 implements communication with the power receiving apparatus 103 via the communication antenna 208 under the control of the communication control unit 204. In this embodiment, it is possible to perform communication associated with various control operations for wireless power transmission by using the communication unit 207. Note that the communicable range (communication range) of the communication unit 207 is wider than the power transmission range 102. The power transmitting unit 205 controls various parameters such as a current value or voltage value to be applied to the power transmitting antenna 206 under the control of the power transmission control unit 201, and implements wireless power transmission to the power receiving apparatus 103. Note that the power transmitting apparatus 101 of this embodiment includes the power transmitting units 205 and power transmitting antennas 206, the numbers of which are equal to that of supported WPT methods. The detection unit 209 detects that the power receiving apparatuses 103 exist within the power transmission range of the power transmitting apparatus 101. The detection unit 209 can also detect a specific position in the power transmission range, at which the specific power receiving apparatus 103 exists.

Each power receiving apparatus 103 is configured to include power receiving antennas 210, power receiving units 211, a communication antenna 212, a communication unit 213, a power reception control unit 214, a UI (User Interface) 215, a storage unit 216, and a communication control unit 217. The power reception control unit 214 controls the power receiving unit 211 to be able to receive power transmitted by the WPT method decided by the power transmitting apparatus 101. The power reception control unit 214 is connected to a chargeable battery, and charges the battery by the power received by the power receiving unit 211. Note that the power reception control unit 214 can control to directly use the power received from the power transmitting apparatus 101 as the power supply of a processor, instead of charging the battery. The UI 215 serves as an interface used by the user to make various settings in the power receiving apparatus 103. The storage unit 216 is used to, for example, store information about the settings input through the UI 215.

The communication control unit 217 controls the communication unit 213 to implement communication with the power transmitting apparatus 101. The communication unit 213 implements communication with the power transmitting apparatus 101 via the communication antenna 212 under the control of the communication control unit 217. In this embodiment, it is possible to perform communication associated with various control operations for wireless power transmission by using the communication unit 213. Note that the power receiving apparatus 103 shown in FIG. 2 supports the first and second WPT methods shown in Table 1. The power receiving apparatus 103 shown in FIG. 2 includes the two power receiving antennas 210 and the two power receiving units 211. This embodiment assumes a case in which the plurality of power receiving apparatuses 103 such as a power receiving apparatus 103 supporting only one WPT method and a power receiving apparatus 103 supporting three WPT methods exist within the power transmission range 102 of the power transmitting apparatus 101. If the first and second WPT methods can share the power receiving antenna 210 and power receiving unit 211, it is possible to implement the power receiving apparatus 103 by one power receiving antenna 210 and one power receiving unit 211.

Figure 3:
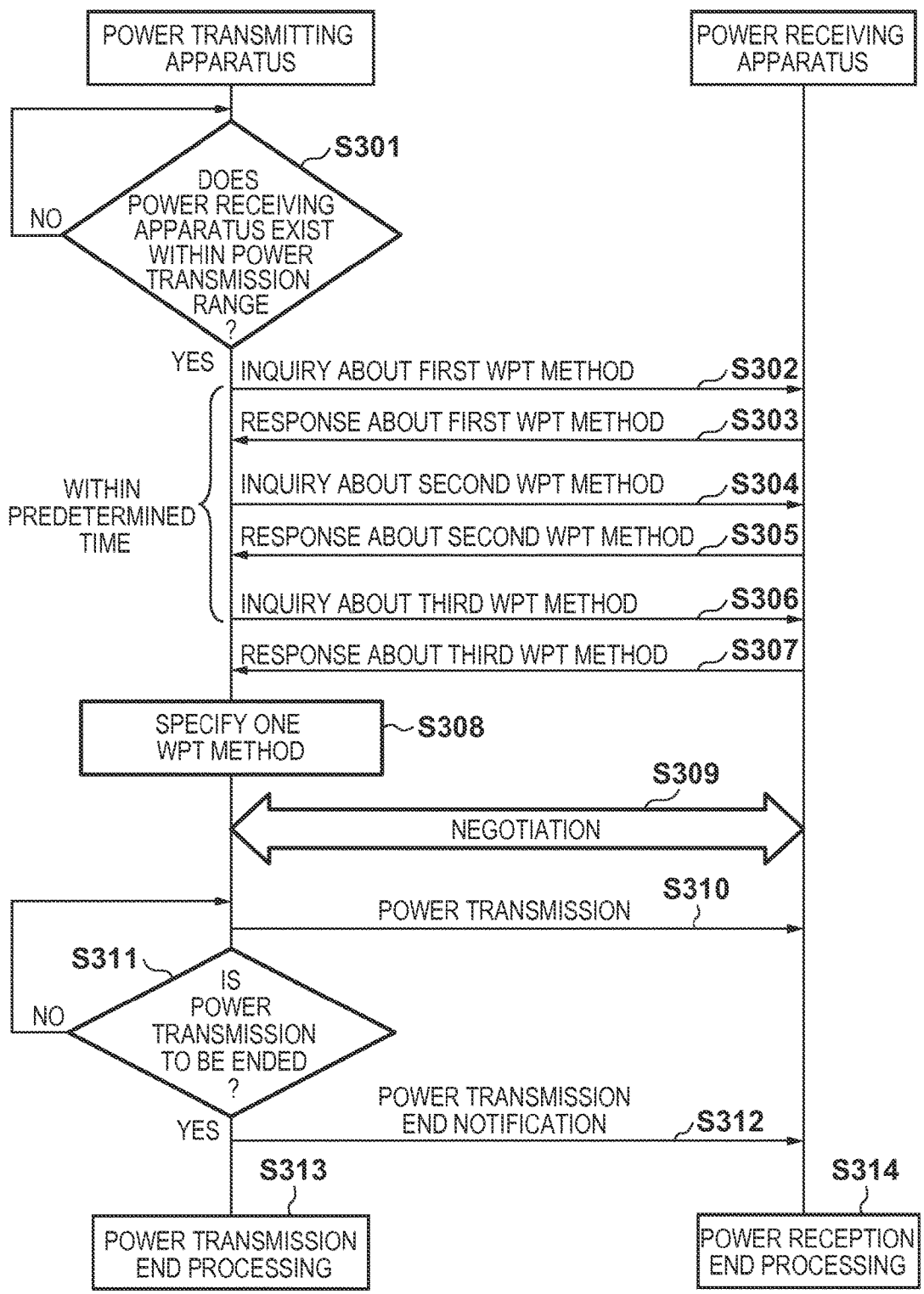
FIG. 3 is a sequence chart for explaining the operation of a power transmitting apparatus 101 and power receiving apparatus 103 according to the first embodiment.

The operation of the power transmitting apparatus 101 and power receiving apparatus 103 according to this embodiment will be described with reference to a sequence chart shown in FIG. 3. FIG. 3 is a sequence chart for explaining the operation of the power transmitting apparatus 101 and power receiving apparatus 103 according to this embodiment. In S301 of FIG. 3, the power transmitting apparatus 101 determines whether the power receiving apparatus 103 exists within the power transmission range. If the power transmitting apparatus 101 determines that the power receiving apparatus 103 exists within the power transmission range (YES in S301), it transmits a signal (first inquiry signal) complying with the communication method and format of the first WPT method to the power receiving apparatus 103 (S302). If the power receiving apparatus 103 supports the first WPT method, it transmits, to the power transmitting apparatus 101, a response (first response) to the first inquiry signal (S303). The power receiving apparatus 103 which does not support the first WPT method transmits no response (or transmits an error message) even if it receives the first inquiry signal.

The power transmitting apparatus 101 transmits a signal (second inquiry signal) complying with the communication method and format of the second WPT method to the power receiving apparatus 103 (S304). If the power receiving apparatus 103 supports the second WPT method, it transmits a response (second response) to the second inquiry signal (S305). The power receiving apparatus 103 which does not support the second WPT method transmits no response (or transmits an error message) even if it receives the second inquiry signal.

The power transmitting apparatus 101 transmits a signal (third inquiry signal) complying with the communication method and format of the third WPT method to the power receiving apparatus 103 (S306). If the power receiving apparatus 103 supports the third WPT method, it transmits a response (third response) to the third inquiry signal (S307). The power receiving apparatus 103 which does not support the third WPT method transmits no response (or transmits an error message) even if it receives the third inquiry signal. For example, since the power receiving apparatus 103 shown in FIG. 2 does not support the third WPT method, it transmits no response (or transmits an error message) even if it receives the third inquiry signal from the power transmitting apparatus 101.

Note that the power transmitting apparatus 101 finishes transmission of inquiry signals about all the WPT methods supported by the power transmitting apparatus 101 within a predetermined time after the first inquiry signal is transmitted. Since the power transmitting apparatus 101 of this embodiment supports the three WPT methods, it transmits three inquiry signals within the predetermined time.

Based on the presence/absence of responses to the first, second, and third inquiry signals and/or the contents of the responses, the power transmitting apparatus 101 specifies a WPT method supported by the power receiving apparatus 103. If there are a plurality of WPT methods supported by both the power transmitting apparatus 101 and the power receiving apparatus 103, the power transmitting apparatus 101 decides one of the WPT methods to be used for power transmission to the power receiving apparatus 103 (S308). A method of deciding a WPT method will be described later. The power transmitting apparatus 101 executes a negotiation of parameters associated with power transmission by exchanging, with the power receiving apparatus 103, signals complying with the communication method and format of the WPT method decided in S308 (S309). In the negotiation according to this embodiment, the power transmitting apparatus 101 acquires, from the power receiving apparatus 103, control information such as the charging status (0% to 100%), requested power amount (for example, 5 W), and current operation mode (communication or sleep mode) of the power receiving apparatus 103. Based on the acquired various kinds of information about the power receiving apparatus 103, the power transmission control unit 201 of the power transmitting apparatus 101 decides parameters such as a driving frequency and a current value or voltage value to be applied to the power transmitting antenna 206. Upon completion of the negotiation, the power transmitting apparatus 101 starts to transmit power (S310).

During power transmission, the power transmitting apparatus 101 determines at predetermined time intervals whether to end power transmission. If the power transmitting apparatus 101 determines to end power transmission (YES in S311), it transmits a power transmission end notification to the power receiving apparatus 103 (S312), and then performs power transmission end processing (S313). The power transmission end notification is a signal complying with the communication method and format of the WPT method decided in S308. Upon receiving the power transmission end notification from the power transmitting apparatus 101, the power receiving apparatus 103 performs power reception end processing (S314).

Figure 4:
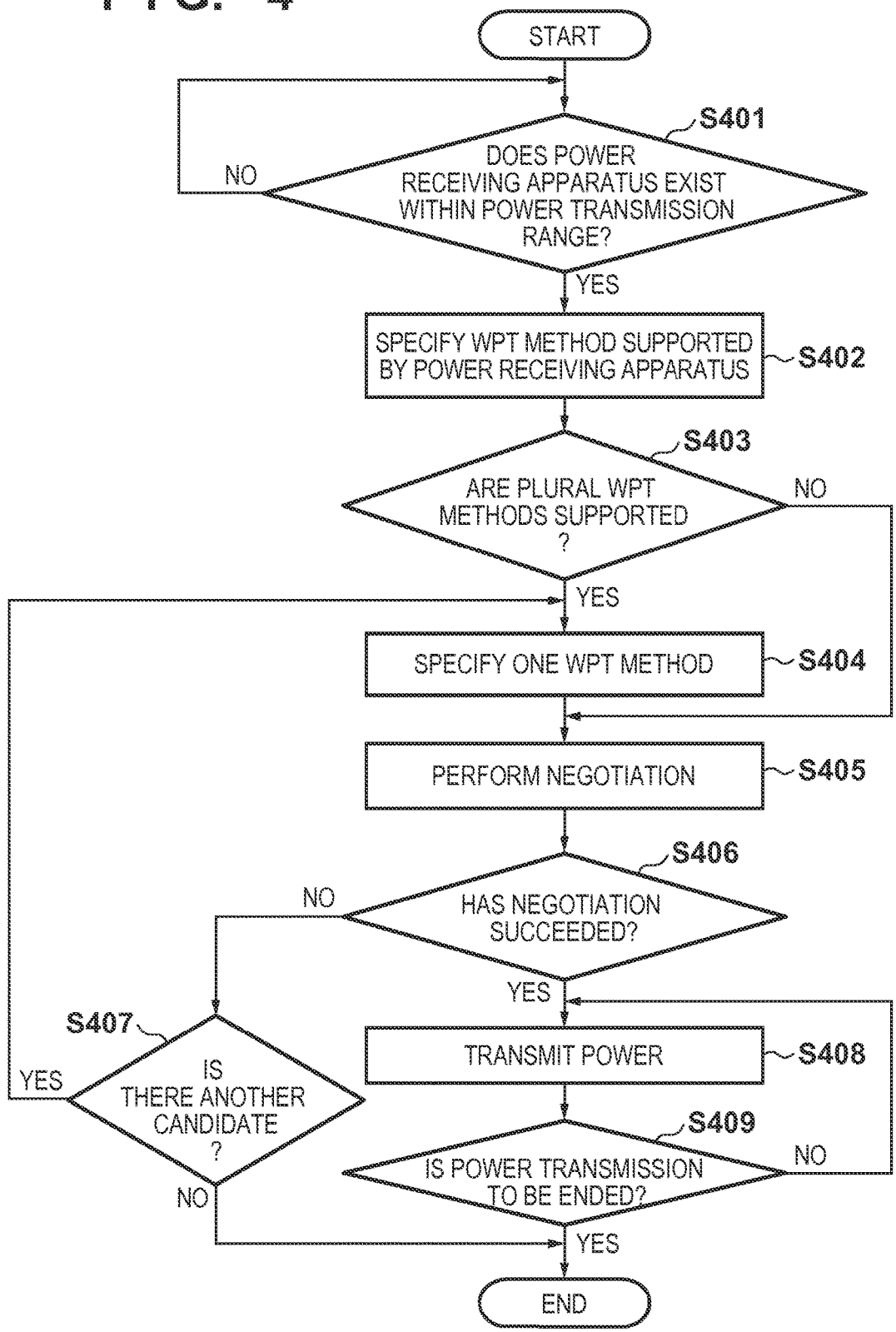
FIG. 4 is a flowchart for explaining the operation of the power transmitting apparatus 101 according to the first embodiment.

The operation of the power transmitting apparatus 101 according to this embodiment will be described with reference to FIG. 4. FIG. 4 is a flowchart for explaining the operation of the power transmitting apparatus 101 according to this embodiment. The power transmitting apparatus 101 of this embodiment implements the operation shown in FIG. 4 when a CPU (not shown) reads out a necessary program from a ROM, and executes it. Note that the power transmitting apparatus 101 of this embodiment is a power transmitting apparatus supporting the plurality of wireless power transmission methods (WPT methods). That is, while performing wireless power transmission to the power receiving apparatus 103 by the first WPT method, the power transmitting apparatus 101 can perform wireless power transmission to the power receiving apparatus 103 by the second WPT method, and transmit power to the power receiving apparatus 103 by the third WPT method. Upon power-on, the power transmitting apparatus 101 of this embodiment starts processing in step S401.

In step S401 of FIG. 4, the detection unit 209 of the power transmitting apparatus 101 determines whether a new power receiving apparatus 103 is detected within the power transmission range. If the detection unit 209 detects the new power receiving apparatus 103 within the power transmission range (YES in step S401), the process advances to step S402. In step S402, the power transmission control unit 201 specifies a WPT method supported by the power receiving apparatus 103 detected in step S401. More specifically, as shown in FIG. 3, the communication unit 207 transmits the first, second, and third inquiry signals to the power receiving apparatus 103. Based on the presence/absence of responses to the signals and/or the contents of the responses, the power transmission control unit 201 specifies the WPT method supported by the power receiving apparatus 103. Upon completion of specifying the WPT method supported by the power receiving apparatus 103, the process advances to step S403.

In step S403, the power transmission control unit 201 determines whether there are a plurality of WPT methods supported by both the power transmitting apparatus 101 and the power receiving apparatus 103 detected in step S401. If it is determined that there are a plurality of WPT methods supported by both the power transmitting apparatus 101 and the power receiving apparatus 103 (YES in step S403), the process advances to step S404. If it is determined that only one WPT method is supported by both the apparatuses (NO in step S403), the process advances to step S405. In step S404 (a decision procedure), the power transmission control unit 201 decides a WPT method to be used for power transmission to the power receiving apparatus 103 detected in step S401. That is, the power transmission control unit 201 decides, from the plurality of wireless power transmission methods, a wireless power transmission method to be used for power transmission to the power receiving apparatus 103 existing within the power transmission range. A practical example of a method of deciding a WPT method according to this embodiment will be described below.

The first decision method is a method of deciding a WPT method, whose remaining amount of transmissible power is larger, to be used for power transmission to the power receiving apparatus 103. That is, if the first power receiving apparatus 103-1 is detected in step S401, a WPT method by which a largest amount of power can be transmitted is the third WPT method (the remaining amount is 50 W), as shown in Table 1. If, therefore, the power receiving apparatus 103-1 supports the third WPT method, the power transmission control unit 201 decides the third WPT method as a WPT method for power transmission to the power receiving apparatus 103-1. If the second power receiving apparatus 103-2 is detected while transmitting a power of 30 W to the power receiving apparatus 103-1 by the third WPT method, a WPT method by which a largest amount of power can be transmitted is the second WPT method (the remaining amount is 20 W). Note that the remaining amount of transmissible power of the third WPT method is 50 W–30 W=20 W. In this embodiment, however, assume that a method except for the WPT method already used for power transmission is preferentially decided. Therefore, if the power receiving apparatus 103-2 supports the second WPT method, the power transmission control unit 201 decides the second WPT method as a WPT method for power transmission to the power receiving apparatus 103-2.

On the other hand, if the power receiving apparatus 103-2 does not support the second WPT method, the power transmission control unit 201 decides, as a WPT method for power transmission to the power receiving apparatus 103-2, the third WPT method whose remaining amount of transmissible power is second largest to the second WPT method. If the power receiving apparatus 103-2 does not support the third WPT method either, the power transmission control unit 201 decides the first WPT method as a WPT method to be used for power transmission to the power receiving apparatus 103-2. In this way, the power transmission control unit 201 of this embodiment preferentially selects, as a WPT method to be used for power transmission to the power receiving apparatus 103, a WPT method whose remaining amount of transmissible power is larger.

As described above, the power transmission control unit 201 of the power transmitting apparatus 101 decides to transmit power to the power receiving apparatus 103 by a WPT method corresponding to a larger amount of power among the amounts of transmissible power of the plurality of WPT methods (the first, second, and third WPT methods). This can improve the possibility that even if a power receiving apparatus 103-3 which supports only a WPT method by which a small amount of power can be transmitted is newly detected, power is simultaneously transmitted to the three power receiving apparatuses 103-1, 103-2, and 103-3. Note that if the remaining amounts of transmissible power of the plurality of WPT methods are equal to each other, a method which is not currently in use or a method whose predetermined priority order is high may be preferentially selected.

The second decision method is a method of deciding a WPT method to be used for power transmission to the power receiving apparatus 103 within the power transmission range based on a WPT method supported by another power receiving apparatus existing within the communication range. That is, if two other power receiving apparatuses exist within a range wider than the power transmission range 102, the communication unit 207 of the power transmitting apparatus 101 communicates with each of the other power receiving apparatuses to acquire information indicating a WPT method supported by the power receiving apparatus. If there is a WPT method which is not supported by another power receiving apparatus 103 within the communication range, the power transmission control unit 201 decides to transmit power to the power receiving apparatus 103 existing within the power transmission range by the WPT method. For example, the power receiving apparatus 103 existing within the power transmission range supports the first and second WPT methods, and the two other power receiving apparatuses within the communication range of the power transmitting apparatus 101 support not the second WPT method but the first WPT method, the power transmission control unit 201 makes a decision as follows. That is, the power transmission control unit 201 of the power transmitting apparatus 101 decides to transmit power to the power receiving apparatus 103 within the power transmission range by the second WPT method.

As described above, the communication unit 207 of the power transmitting apparatus 101 acquires information about a WPT method supported by another power receiving apparatus existing within the communication range wider than the power transmission range. Based on the information about the WPT method supported by the other power receiving apparatus, the power transmission control unit 201 decides a WPT method to be used for power transmission to the power receiving apparatus 103. This can improve the possibility that when the other power receiving apparatus 103-2 requests power transmission during power transmission to the power receiving apparatus 103, power can be simultaneously transmitted to the plurality of power receiving apparatuses 103.

Note that one of the two other power receiving apparatuses within the communication range supports only the first WPT method and the other supports only the second WPT method, the power transmission control unit 201 decides a WPT method to be used for power transmission to the power receiving apparatus 103 within the power transmission range as follows. That is, the power transmission control unit 201 of the power transmitting apparatus 101 decides to transmit power to the power receiving apparatus 103 within the power transmission range by the WPT method which is supported by the power receiving apparatus whose remaining battery amount is larger among the two other power receiving apparatuses. The present invention, however, is not limited to this. For example, it is possible to decide to transmit power to the power receiving apparatus 103 within the power transmission range by the WPT method by which a larger amount of power can be transmitted among the first and second WPT methods.

The third decision method is a method of deciding a WPT method based on history information. The storage unit 203 of the power transmitting apparatus 101 stores, in association with each other, pieces of identification information of the power receiving apparatuses 103 to which power has been transmitted in the past and WPT methods which have been used in the past. Based on the identification information of the power receiving apparatus 103 within the power transmission range, the power transmission control unit 201 searches for a WPT method used in the past for power transmission to the power receiving apparatus 103, and decides to transmit power by the WPT method.

That is, the power transmission control unit 201 decides a WPT method to be used for power transmission to the power receiving apparatus 103 using history information about the WPT method used for power transmission to the power receiving apparatus 103. Note that when the power transmitting apparatus 101 is already transmitting power to another power receiving apparatus 103, it may be impossible to transmit power by the WPT method decided based on the history information. In this case, the power transmission control unit 201 may decide to transmit power to the power receiving apparatus 103 by a WPT method whose remaining amount of transmissible power is larger among the remaining WPT methods.

The fourth decision method is a method of deciding a WPT method based on the position of the power receiving apparatus 103 within the power transmission range. A mark 104 shown in FIG. 1 is used to help arrange the power receiving apparatus 103 which desires power transmission by the first WPT method. If, for example, the user wants to charge the power receiving apparatus 103 by the first WPT method, he/she places the power receiving apparatus 103 near the mark 104. This makes it possible to charge the power receiving apparatus 103 by the first WPT method.

In this example, the detection unit 209 detects the position of the power receiving apparatus 103 existing within the power transmission range, and the power transmission control unit 201 decides a WPT method to be used for power transmission to the power receiving apparatus 103 based on its position. This enables the user to designate a WPT method depending on a position at which the power receiving apparatus 103 is placed. Note that FIG. 1 shows only the mark 104 indicating a position where power is transmitted by the first WPT method. In addition, a mark indicating a position for the second WPT method and a mark indicating a position for the third WPT method may be provided.

The fifth decision method is a decision method in which the user directly designates a WPT method. That is, the user designates a WPT method via the UI 202 of the power transmitting apparatus 101, and the power transmission control unit 201 decides a WPT method to be used for power transmission to the power receiving apparatus 103 based on the contents designated by the user. For example, the user is allowed to designate a WPT method using the UI 202 in S308 of FIG. 3. Alternatively, for example, the user may designate the priority order of each WPT method via the UI 202. The user may designate a policy of deciding a WPT method (for example, a method whose remaining amount of transmissible power is larger is prioritized or a WPT method is decided based on the position of the power receiving apparatus 103) via the UI 202.

The sixth decision method is a method of deciding a WPT method based on a WPT method currently in progress. For example, when the existence of the power receiving apparatus 103-2 is newly detected while the power transmitting apparatus 101 transmits power to the power receiving apparatus 103-1 by the second WPT method, the power transmission control unit 201 decides the second WPT method as a WPT method to be used for power transmission to the power receiving apparatus 103-2. That is, the power transmission control unit 201 decides, as a WPT method to be used for power transmission to the power receiving apparatus 103-2, the same WPT method as that in progress for power transmission to the other power receiving apparatus 103-1. This can reduce the number of power transmitting units 205 to be operated and that of power transmitting antennas 206 to be operated as much as possible. Note that in the above example, when it is impossible to use the second WPT method for power transmission to the power receiving apparatus 103-2, the power transmission control unit 201 may decide to transmit power by a WPT method whose remaining amount of transmissible power is larger among the remaining WPT methods.

The seventh decision method is a method of selecting a WPT method having highest power transmission efficiency. FIG. 13 is a sequence chart for explaining this decision method. Operations in S1301 to S1307 are the same as those in S301 to S307 of FIG. 3. With the operations up to S1307, the power transmitting apparatus 101 recognizes a WPT method supported by the power receiving apparatus 103. In this example, a case in which the power receiving apparatus 103 supports all of the first, second, and third WPT methods will be exemplified. The power transmitting apparatus 101 transmits a signal to inquire about a receiving voltage for power transmission by the first WPT method to the power receiving apparatus 103 in S1308. In S1309, the power transmitting apparatus 101 transmits power by the first WPT method. At this time, the power transmitting apparatus 101 transmits power smaller than that at the normal power transmission output. However, the power transmitting apparatus 101 may transmit power at the normal power transmission output. In S1310, the power receiving apparatus 103 notifies the power transmitting apparatus 101 of a receiving voltage value.

In S1311, the power transmitting apparatus 101 transmits a signal to inquire about a receiving voltage for power transmission by the second WPT method to the power receiving apparatus 103. In S1312, the power transmitting apparatus 101 transmits power by the second WPT method. At this time, the power transmitting apparatus 101 transmits power smaller than that at the normal power transmission output. However, the power transmitting apparatus 101 may transmit power at the normal power transmission output. In S1313, the power receiving apparatus 103 notifies the power transmitting apparatus 101 of a receiving voltage value. Furthermore, in S1314, the power transmitting apparatus 101 transmits a signal to inquire about a receiving voltage for power transmission by the third WPT method to the power receiving apparatus 103. In S1315, the power transmitting apparatus 101 transmits power by the third WPT method. At this time, the power transmitting apparatus 101 transmits power smaller than that at the normal power transmission output. However, the power transmitting apparatus 101 may transmit power at the normal power transmission output. In S1316, the power receiving apparatus 103 notifies the power transmitting apparatus 101 of a receiving voltage value.

The power transmitting apparatus 101 calculates the power transmission efficiency of each WPT method based on the power transmission output and the receiving voltage value notified by the power receiving apparatus 103, and decides to transmit power by a WPT method having the highest power transmission efficiency in S1317. The power transmission efficiency can be calculated based on, for example, the ratio between the voltage value of the power transmission output value and the receiving voltage value.

Note that for the first WPT method, at the time of response in S1303, the power transmitting apparatus 101 may be notified of the receiving voltage value obtained at the time of inquiry in S1302. In the above example, the power transmitting apparatus 101 calculates the power transmission efficiency of each WPT method. However, upon receiving the notification of the power transmission output value from the power transmitting apparatus 101, the power receiving apparatus 103 may calculate the power transmission efficiency based on the receiving voltage value, and decide a WPT method.

As described above, the power transmission control unit 201 decides a WPT method to be used for power transmission to the power receiving apparatus 103 using one of the above decision methods. Note that the power transmitting apparatus may display the WPT method decided by one of the first to seventh decision methods on a display unit (not shown), and the user may finally decide the WPT method.

Referring back to FIG. 4, when one WPT method is decided in step S404 of FIG. 4, the power transmission control unit 201 negotiates with the power receiving apparatus 103 for wireless power transmission (step S405). In the negotiation according to this embodiment, the power transmitting apparatus 101 acquires control information such as the device type, charging status (0 to 100%), requested power amount (for example, 5 W), and current operation mode (communication or sleep mode) of the power receiving apparatus 103. Based on the acquired various kinds of information about the power receiving apparatus 103, the power transmission control unit 201 of the power transmitting apparatus 101 decides parameters such as a driving frequency and a current value or voltage value to be applied to the power transmitting antenna 206.

After the start of the negotiation, the power transmission control unit 201 determines whether the negotiation has succeeded (step S406). Whether the negotiation has succeeded is determined depending on whether the power transmitting apparatus 101 can execute power transmission appropriate for the various kinds of information (the charging status and the requested power amount) about the power receiving apparatus 103 acquired by the power transmitting apparatus 101. If the power transmission control unit 201 determines that the negotiation has succeeded (YES in step S406), it controls the power transmitting unit 205 to start power transmission (step S408). That is, the power transmitting unit 205 transmits power to the power receiving apparatus 103 in step S408 (a power transmission procedure).

On the other hand, if the power transmission control unit 201 determines that the negotiation has failed (NO in step S406), it determines whether there is another candidate of a WPT method (step S407). If it is determined that there is another candidate of a WPT method, a negotiation is performed by the other WPT method (step S405). If it is determined that there is no other candidate of a WPT method, the processing shown in FIG. 4 is terminated.

The power transmission control unit 201 determines whether to end power transmission every time a predetermined time elapses after the start of power transmission (step S409). A power transmission end condition can include, for example, the full charge state of the battery of the power receiving apparatus 103, an internal error of the power transmitting apparatus 101, or an error in current value or voltage value in the power transmitting antenna 206. Alternatively, a power transmission end condition can be reception of a power reception end notification from the power receiving apparatus 103. If the power transmission control unit 201 determines to end power transmission in step S409, it transmits a power transmission end notification to the power receiving apparatus 103, as needed, thereby terminating the processing of FIG. 4. On the other hand, if the power transmission control unit 201 determines not to end power transmission in step S409, the process returns to step S408 to continue power transmission.

Figure 5:
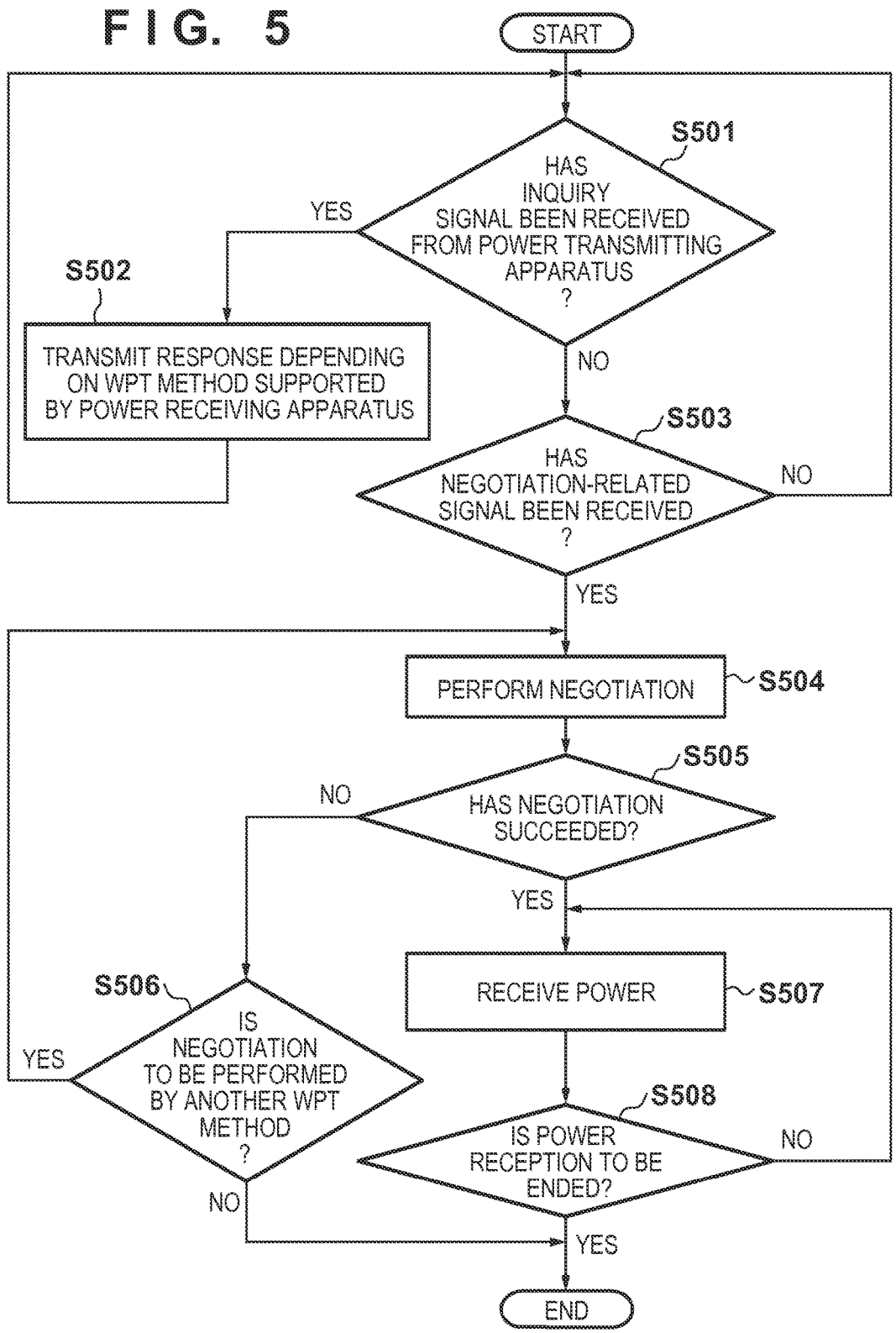
FIG. 5 is a flowchart for explaining the operation of the power receiving apparatus 103 according to the first embodiment.

The operation of the power receiving apparatus 103 according to this embodiment will be described with reference to FIG. 5. FIG. 5 is a flowchart for explaining the operation of the power receiving apparatus 103 according to this embodiment. The power receiving apparatus 103 of this embodiment implements the operation shown in FIG. 5 when a CPU (not shown) reads out a necessary program from a ROM, and executes it. When the user sets a power receiving mode, the power receiving apparatus 103 of this embodiment starts processing in step S501.

In step S501, the power reception control unit 214 of the power receiving apparatus 103 determines whether a signal (inquiry signal) complying with the communication method and format of each WPT method has been received from the power transmitting apparatus 101. Upon receiving an inquiry signal, the power reception control unit 214 determines whether the WPT method corresponding to the inquiry signal is supported. If it is determined that the WPT method corresponding to the inquiry signal is supported (YES in step S501), the communication unit 213 transmits a response to the inquiry signal to the power transmitting apparatus 101 (step S502). On the other hand, if it is determined that the WPT method corresponding to the inquiry signal is not supported, the communication unit 213 transmits no response (or transmits an error message) to the power transmitting apparatus 101.

If it is determined in step S501 that no inquiry signal has been received (NO in step S501), the power reception control unit 214 determines whether a negotiation-related signal has been received from the power transmitting apparatus 101 (step S503). The negotiation-related signal is, for example, a signal for an information request to the power receiving apparatus 103. By using the negotiation-related signal, the power transmitting apparatus 101 can request, for example, information about the remaining battery amount of the power receiving apparatus 103 and information about the requested power amount of the power receiving apparatus 103. If it is determined in step S503 that a negotiation-related signal has been received (YES in step S503), the process advances to step S504; otherwise (NO in step S503), the process returns to step S501. Note that the power transmitting apparatus 101 of this embodiment supports the three WPT methods, and thus the processes in steps S501 and S502 are normally repeated three times.

In step S504, the power reception control unit 214 performs a negotiation to decide parameters for power transmission by the WPT method designated by the power transmitting apparatus 101. In the negotiation according to this embodiment, the power transmitting apparatus 101 acquires, from the power receiving apparatus 103, control information such as the device type, charging status (0 to 100%), requested power amount (for example, 5 W), and current operation mode (communication or sleep mode) of the power receiving apparatus 103. Based on the acquired various kinds of information, the power transmitting apparatus 101 decides parameters such as a driving frequency and a current value or voltage value to be applied to the power transmitting antenna 206. In step S505, the power reception control unit 214 determines whether the negotiation in step S504 has succeeded. Whether the negotiation has succeeded is determined depending on whether the power transmitting apparatus 101 can execute power transmission appropriate for the various kinds of information (the charging status and the requested power amount) acquired from the power receiving apparatus 103. The power receiving apparatus 103 can determine whether the negotiation has succeeded by receiving, from the power transmitting apparatus 101, a notification indicating whether the negotiation has succeeded.

If the power reception control unit 214 determines that the negotiation has succeeded (YES in step S505), it controls the power receiving unit 211 to start power reception (step S507). On the other hand, if the power reception control unit 214 determines that the negotiation has failed (NO in step S505), it determines whether a signal for a negotiation of another WPT method has been received (step S506). If no signal for a negotiation of another WPT method has been received for a predetermined time after determining in step S505 that the negotiation has failed (NO in step S506), the power reception control unit 214 terminates the processing shown in FIG. 5. On the other hand, if the power reception control unit 214 determines that a signal for a negotiation of another WPT method has been received before a predetermined time elapses after determining in step S505 that the negotiation has failed (YES in step S506), a negotiation is performed again (step S504).

The power reception control unit 214 determines whether to end power reception every time a predetermined time elapses after the start of power reception (step S508). A power reception end condition can include, for example, the full charge state of the battery of the power receiving apparatus 103, an internal error of the power receiving apparatus 103, or an error in current value or voltage value in the power receiving antenna 210. Alternatively, a power reception end condition can be reception of a power transmission end notification from the power transmitting apparatus 101. If the power reception control unit 214 determines to end power reception in step S508, it transmits a power reception end notification to the power transmitting apparatus 101, as needed, thereby terminating the processing of FIG. 5. On the other hand, if the power reception control unit 214 determines not to end power reception in step S508, the process returns to step S507 to continue power reception.

According to the sequence chart shown in FIG. 3, the power transmitting apparatus 101 inquires of the power receiving apparatus 103 about the first, second, and third WPT methods, and specifies the WPT method supported by the power receiving apparatus 103 based on the response from the power receiving apparatus 103. The present invention, however, is not limited to this. The power transmitting apparatus 101 may directly inquire of the power receiving apparatus 103 about the WPT method supported by the power receiving apparatus 103.

FIG. 9 is a sequence chart obtained by changing the sequence chart shown in FIG. 3 so that the power transmitting apparatus 101 directly inquires of the power receiving apparatus 103 about the WPT method supported by the power receiving apparatus 103. Referring to FIG. 9, the power transmitting apparatus 101 inquires of the power receiving apparatus 103 about the WPT method supported by the power receiving apparatus 103 (S902). Upon receiving the inquiry, the power receiving apparatus 103 notifies the power transmitting apparatus 101 of the supported WPT method. The power transmitting apparatus 101 specifies the WPT method supported by the power receiving apparatus 103 based on the contents of the notification (S903). If the power transmitting apparatus 101 can receive no notification from the power receiving apparatus 103, it may inquire again a predetermined number of times. If the power transmitting apparatus 101 can receive no notification from the power receiving apparatus 103 even after inquiring the predetermined number of times, the processing may be terminated, and an error may be displayed on a display (not shown) or the like. An operation in S904 and subsequent operations are completely the same as those described with reference to the sequence chart shown in FIG. 3.

As described above, in a wireless power transmission system according to this embodiment, the power transmitting apparatus 101 supporting the plurality of WPT methods decides a wireless power transmission method (WPT method) to be used for power transmission to the power receiving apparatus 103 based on various kinds of information. This can improve the efficiency of wireless power transmission in the system supporting the plurality of wireless power transmission methods.

<Second Embodiment>

The second embodiment of the present invention will be described by mainly focusing attention on the difference from the first embodiment. In the first embodiment, a case in which the power transmitting apparatus 101 decides one of the plurality of supported WPT methods to be used for power transmission to the power receiving apparatus 103 has been explained. In this embodiment, a case in which a power receiving apparatus 103 decides a WPT method will be described.

Figure 6:
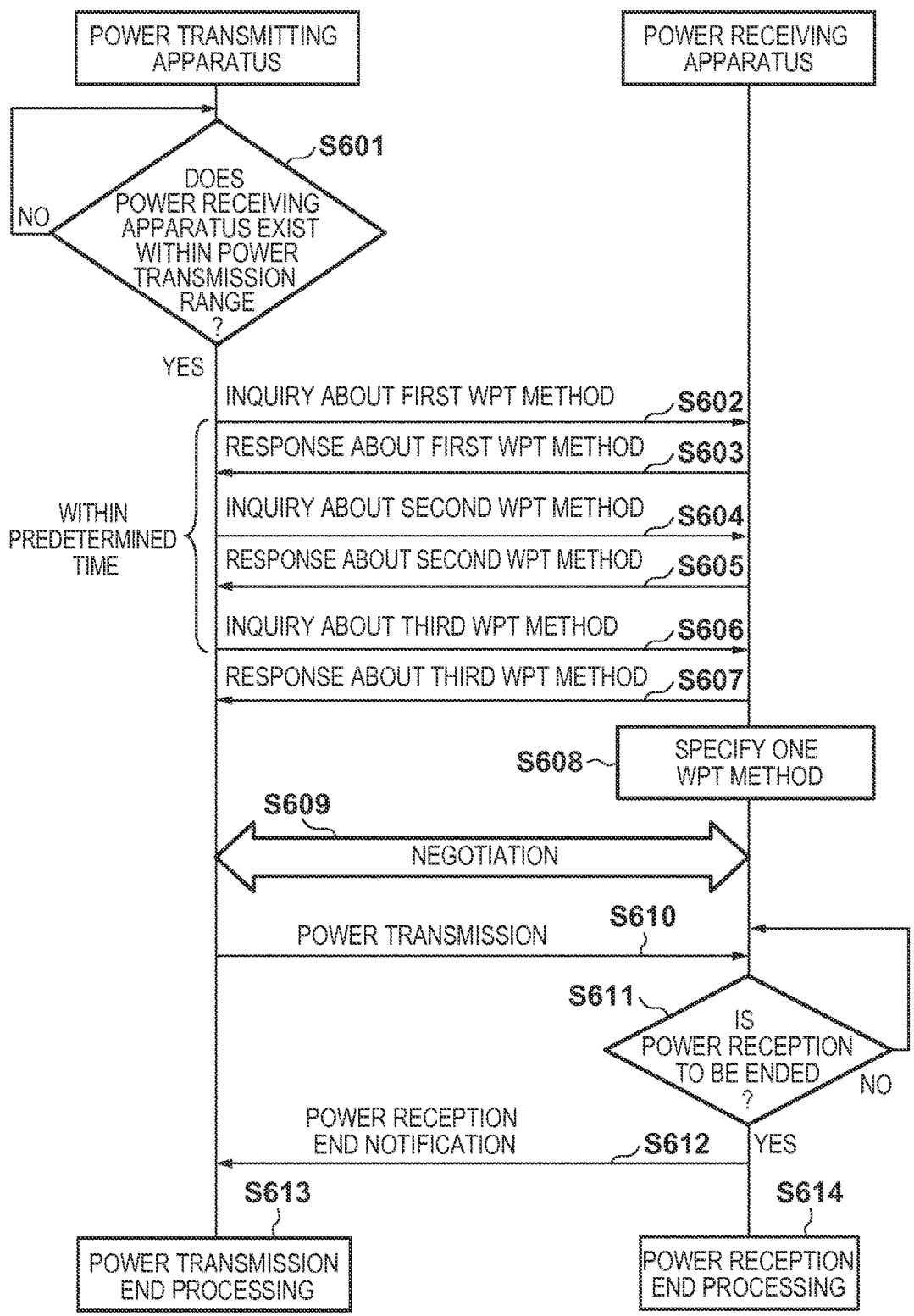
FIG. 6 is a sequence chart for explaining the operation of a power transmitting apparatus 101 and power receiving apparatus 103 according to the second embodiment.

The operation of a power transmitting apparatus 101 and the power receiving apparatus 103 according to this embodiment will be described with reference to a sequence chart shown in FIG. 6. FIG. 6 is a sequence chart for explaining the operation of the power transmitting apparatus 101 and power receiving apparatus 103 according to this embodiment. In S601 of FIG. 6, the power transmitting apparatus 101 determines whether the power receiving apparatus 103 exists within a power transmission range. If the power transmitting apparatus 101 determines that the power receiving apparatus 103 exists within the power transmission range, it transmits a signal (first inquiry signal) complying with the communication method and format of the first WPT method to the power receiving apparatus 103 (S602). If the power receiving apparatus 103 supports the first WPT method, it transmits a response (first response) to the first inquiry signal to the power transmitting apparatus 101 (S603). The power receiving apparatus 103 which does not support the first WPT method transmits no response (or transmits an error message) even if it receives the first inquiry signal.

The power transmitting apparatus 101 transmits a signal (second inquiry signal) complying with the communication method and format of the second WPT method to the power receiving apparatus 103 (S604). If the power receiving apparatus 103 supports the second WPT method, it transmits a response (second response) to the second inquiry signal (S605). The power receiving apparatus 103 which does not support the second WPT method transmits no response (or transmits an error message) even if it receives the second inquiry signal.

The power transmitting apparatus 101 transmits a signal (third inquiry signal) complying with the communication method and format of the third WPT method to the power receiving apparatus 103 (S606). If the power receiving apparatus 103 supports the third WPT method, it transmits a response (third response) to the third inquiry signal (S607). The power receiving apparatus 103 which does not support the third WPT method transmits no response (or transmits an error message) even if it receives the third inquiry signal.

Note that the power transmitting apparatus 101 finishes transmission of inquiry signals about all the WPT methods supported by the power transmitting apparatus 101 within a predetermined time after the first inquiry signal is transmitted. Since the power transmitting apparatus 101 of this embodiment supports the three WPT methods, it transmits three inquiry signals within the predetermined time.

The power receiving apparatus 103 specifies the WPT methods supported by the power transmitting apparatus 101 by receiving the first, second, and third inquiry signals. If there are a plurality of WPT methods supported by both the power transmitting apparatus 101 and the power receiving apparatus 103, the power receiving apparatus 103 decides one of the WPT methods to be used for power transmission to the power receiving apparatus 103 (S608). A method of deciding a WPT method will be described later.

The power transmitting apparatus 101 and the power receiving apparatus 103 execute a negotiation of parameters associated with power transmission by exchanging signals complying with the communication method and format of the WPT method decided in S608 (S609). In the negotiation according to this embodiment, the power transmitting apparatus 101 acquires, from the power receiving apparatus 103, control information such as the device type, charging status (0% to 100%), requested power amount (for example, 5 W), and current operation mode (communication or sleep mode) of the power receiving apparatus 103. Based on the acquired various kinds of information, the power transmitting apparatus 101 decides parameters such as a driving frequency and a current value or voltage value to be applied to a power transmitting antenna 206. Upon completion of the negotiation, the power transmitting apparatus 101 starts to transmit power (S610).

During power reception, the power receiving apparatus 103 determines at predetermined time intervals whether to end power reception. If the power receiving apparatus 103 determines to end power reception, it transmits a power reception end notification to the power transmitting apparatus 101 (S612), and then performs power reception end processing (S614). The power reception end notification is a signal complying with the communication method and format of the WPT method decided in S608. Upon receiving the power reception end notification from the power receiving apparatus 103, the power transmitting apparatus 101 performs power transmission end processing (S613).

Figure 7:
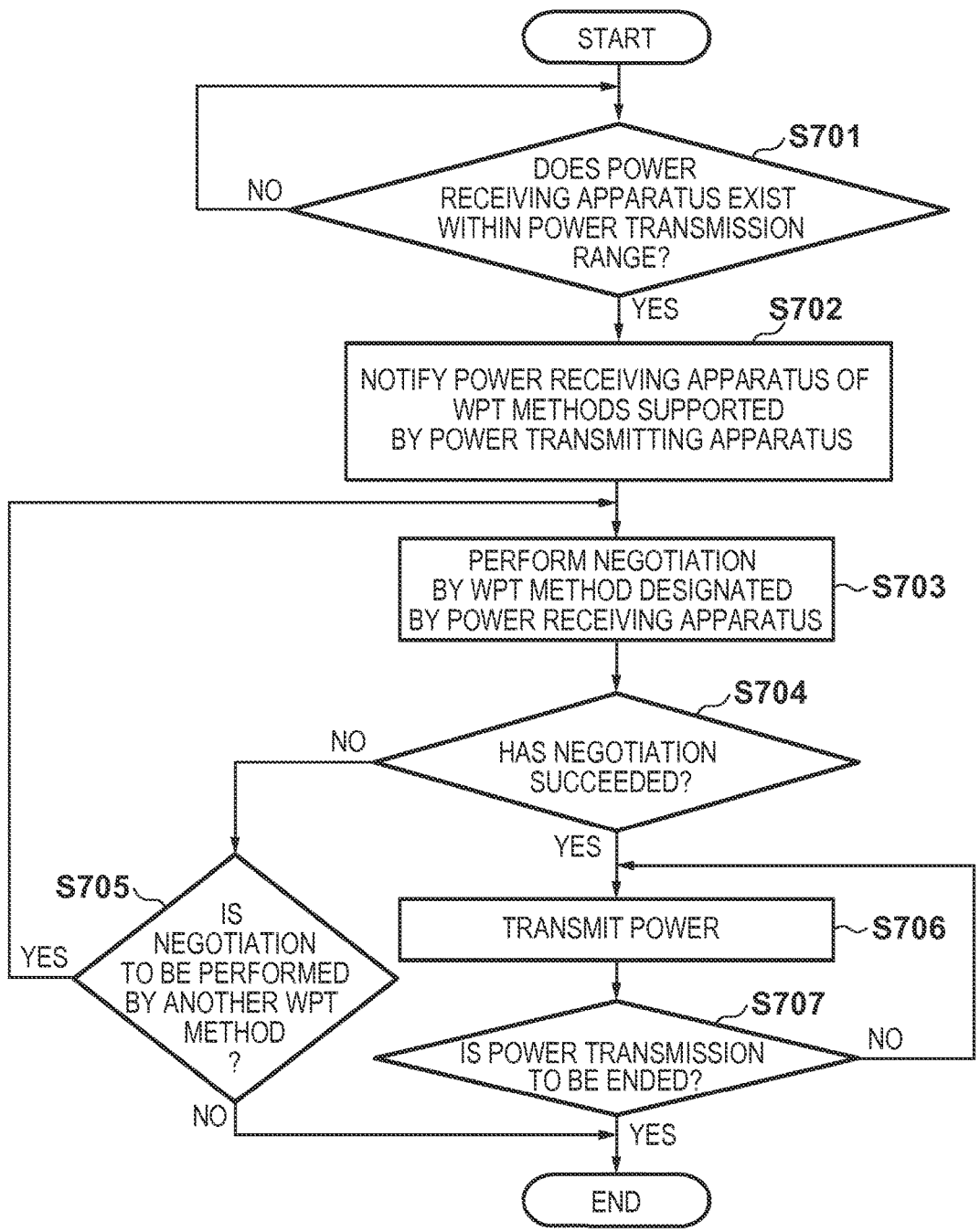
FIG. 7 is a flowchart for explaining the operation of the power transmitting apparatus 101 according to the second embodiment.

The operation of the power transmitting apparatus 101 according to this embodiment will be described with reference to FIG. 7. FIG. 7 is a flowchart for explaining the operation of the power transmitting apparatus 101 according to this embodiment. The power transmitting apparatus 101 of this embodiment implements the operation shown in FIG. 7 when a CPU (not shown) reads out a necessary program from a ROM, and executes it. Note that the power transmitting apparatus 101 of this embodiment is a power transmitting apparatus supporting a plurality of wireless power transmission methods (WPT methods). That is, while performing wireless power transmission to the power receiving apparatus 103 by the first WPT method, the power transmitting apparatus 101 can perform wireless power transmission to the power receiving apparatus 103 by the second WPT method, and perform power transmission to the power receiving apparatus 103 by the third WPT method. Upon power-on, the power transmitting apparatus 101 of this embodiment starts processing in step S701.

In step S701 of FIG. 7, a detection unit 209 of the power transmitting apparatus 101 determines whether a new power receiving apparatus 103 is detected within the power transmission range. If the detection unit 209 detects a new power receiving apparatus within the power transmission range (YES in step S701), the process advances to step S702. In step S702, a communication unit 207 notifies the power receiving apparatus 103 of information about the WPT methods supported by the power transmitting apparatus 101. The communication unit 207 of this embodiment notifies the power receiving apparatus 103 of information of the WPT methods supported by the power transmitting apparatus 101 by transmitting the first, second, and third inquiry signals corresponding to the WPT methods supported by the power transmitting apparatus 101 to the power receiving apparatus 103. A method of notifying the power receiving apparatus 103 of the WPT methods supported by the power transmitting apparatus 101 is not limited to this. For example, it is possible to transmit, as one message, information for notifying the power receiving apparatus 103 of the plurality of WPT methods supported by the power transmitting apparatus 101 to the power receiving apparatus 103. When the processing in step S702 ends, the process advances to step S703.

When the communication unit 207 receives designation information for designating one WPT method from the power receiving apparatus 103, a power transmission control unit 201 starts a negotiation with the power receiving apparatus 103 for wireless power transmission (step S703). In the negotiation according to this embodiment, the power transmitting apparatus 101 acquires information such as the device type, charging status (0 to 100%), requested power amount (for example, 5 W), and current operation mode (communication or sleep mode) of the power receiving apparatus 103. Based on the acquired various kinds of information about the power receiving apparatus 103, the power transmission control unit 201 of the power transmitting apparatus 101 decides parameters such as a driving frequency and a current value or voltage value to be applied to the power transmitting antenna 206.

After the start of the negotiation, the power transmission control unit 201 determines whether the negotiation has succeeded (step S704). Whether the negotiation has succeeded is determined depending on whether the power transmitting apparatus 101 can execute power transmission appropriate for the various kinds of information (the charging status and the requested power amount) about the power receiving apparatus 103 acquired by the power transmitting apparatus 101. If the power transmission control unit 201 determines that the negotiation has succeeded (YES in step S704), it controls a power transmitting unit 205 to start power transmission (step S706). On the other hand, if the power transmission control unit 201 determines that the negotiation has failed (NO in step S704), it determines whether there is another candidate of a WPT method (step S705). If it is determined that there is another candidate of a WPT method, a negotiation is performed by the other WPT method (step S703). If it is determined that there is no other candidate of a WPT method, the processing shown in FIG. 7 is terminated.

The power transmission control unit 201 determines whether to end power transmission every time a predetermined time elapses after the start of power transmission (step S707). A power transmission end condition can include, for example, the full charge state of the battery of the power receiving apparatus 103, an internal error of the power transmitting apparatus 101, or an error in current value or voltage value in the power transmitting antenna 206. Alternatively, a power transmission end condition can be reception of a power reception end notification from the power receiving apparatus 103. If the power transmission control unit 201 determines to end power transmission in step S707, it transmits a power transmission end notification to the power receiving apparatus 103, as needed, thereby terminating the processing of FIG. 7. On the other hand, if the power transmission control unit 201 determines not to end power transmission in step S707, the process returns to step S706 to continue power transmission.

Figure 8:
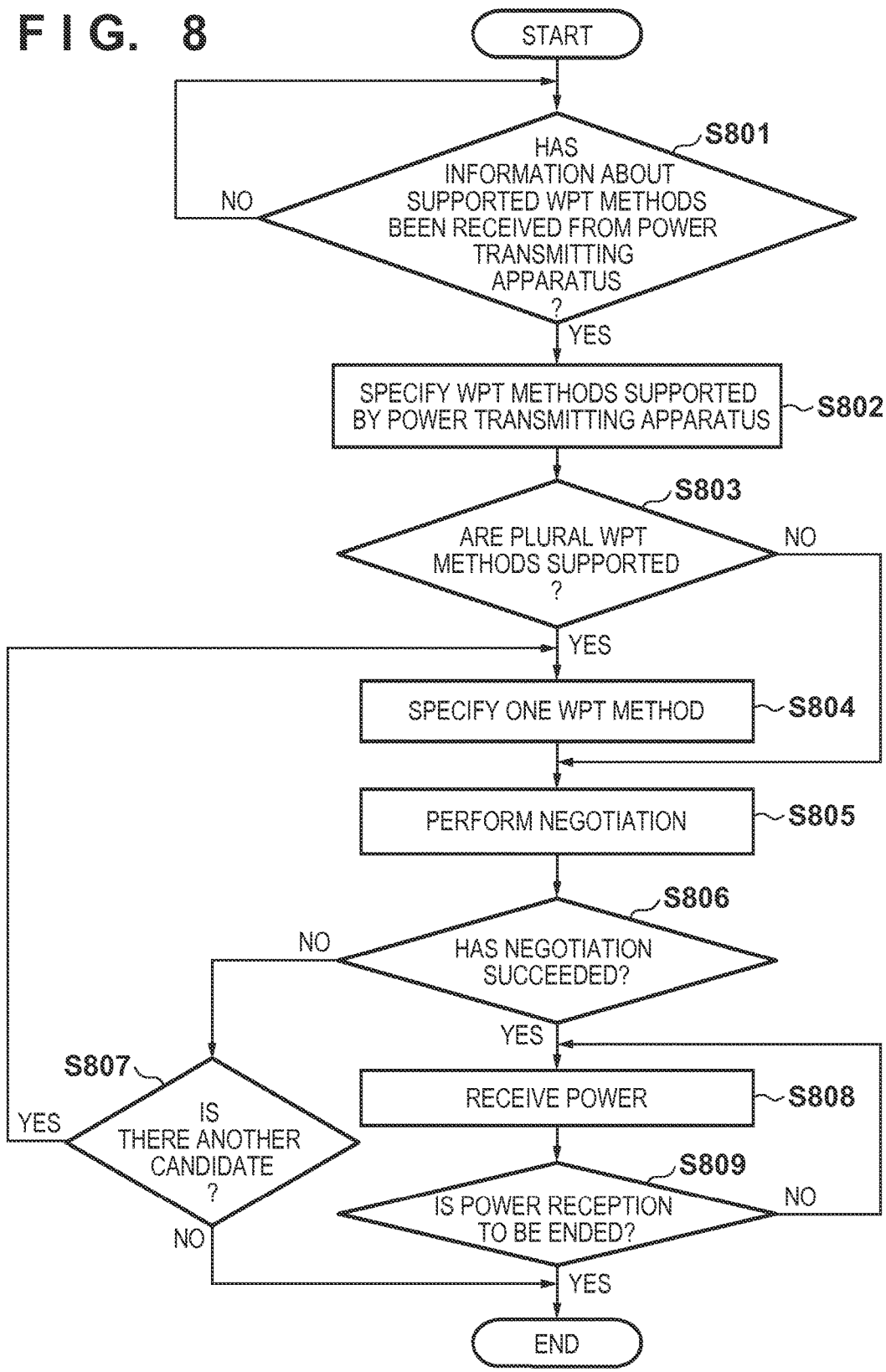
FIG. 8 is a flowchart for explaining the operation of the power receiving apparatus 103 according to the second embodiment.

The operation of the power receiving apparatus 103 according to this embodiment will be described with reference to FIG. 8. FIG. 8 is a flowchart for explaining the operation of the power receiving apparatus 103 according to this embodiment. The power receiving apparatus 103 of this embodiment implements the operation shown in FIG. 8 when a CPU (not shown) reads out a necessary program from a ROM, and executes it. When the user sets the power receiving mode, the power receiving apparatus 103 of this embodiment starts processing in step S801.

In step S801, a power reception control unit 214 of the power receiving apparatus 103 determines whether information about the WPT methods supported by the power transmitting apparatus 101 has been received from the power transmitting apparatus 101. Note that the power receiving apparatus 103 can acquire information about the WPT methods supported by the power transmitting apparatus 101 by receiving the first, second, and third inquiry signals corresponding to the WPT methods supported by the power transmitting apparatus 101 from the power transmitting apparatus 101. Note that a method of notifying the power receiving apparatus of the WPT methods supported by the power transmitting apparatus 101 is not limited to this. For example, the power transmitting apparatus 101 can transmit, as one message, information for notifying the power receiving apparatus 103 of the plurality of WPT methods supported by the power transmitting apparatus 101 to the power receiving apparatus 103. If the power reception control unit 214 determines that information about the WPT methods supported by the power transmitting apparatus 101 has been received (YES in step S801), the process advances to step S802.

In step S802, the power reception control unit 214 specifies the WPT methods supported by the power transmitting apparatus 101. When the WPT methods supported by the power transmitting apparatus 101 are specified, the process advances to step S803. In step S803, the power reception control unit 214 determines whether there are a plurality of WPT methods supported by both the power transmitting apparatus 101 and the power receiving apparatus 103. If it is determined that there are a plurality of WPT methods supported by both the power transmitting apparatus 101 and the power receiving apparatus 103 (YES in step S803), the process advances to step S804. If it is determined that only one WPT method is supported, the process advances to step S805. In step S804 (a decision procedure), the power reception control unit 214 decides a WPT method to be used for power transmission to the power receiving apparatus 103 from the plurality of WPT methods supported by both the power transmitting apparatus 101 and the power receiving apparatus 103. A practical example of a method of deciding a WPT method according to this embodiment will be described below.

The first decision method is a method of deciding a WPT method, whose remaining amount of transmissible power is larger, to be used for power transmission to the power receiving apparatus 103. That is, a communication control unit 217 of the power receiving apparatus 103 acquires the remaining amount of transmissible power of each of the plurality of WPT methods commonly supported by the power transmitting apparatus 101. If both the power transmitting apparatus 101 and the power receiving apparatus 103 support the three WPT methods shown in Table 1, and no power transmission to other power receiving apparatuses 103 is performed, the third WPT method is decided as a WPT method to be used for power transmission. That is, the power reception control unit 214 acquires, from the power transmitting apparatus 101, information indicating that the remaining amount of transmissible power of the first WPT method is 5 W, the remaining amount of transmissible power of the second WPT method is 20 W, and the remaining amount of transmissible power of the third WPT method is 50 W. The power reception control unit 214 then decides, as a WPT method to be used for power transmission to the power receiving apparatus 103, the third WPT method whose remaining amount of transmissible power is largest. If the power receiving apparatus 103 does not support the third WPT method, the power reception control unit 214 decides, as a WPT method to be used for power transmission, the second WPT method whose remaining amount of transmissible power is second largest.

In this way, the power reception control unit 214 of this embodiment preferentially selects, as a WPT method to be used for power transmission to the power receiving apparatus 103, a WPT method whose remaining amount of transmissible power is larger. That is, the power reception control unit 214 of the power receiving apparatus 103 decides, as a WPT method to be used by the power transmitting apparatus 101, a WPT method by which a larger amount of power can be transmitted among the plurality of WPT methods (the first, second, and third WPT methods). Note that if the remaining amounts of transmissible power of the plurality of WPT methods are equal to each other, a method which is not currently in use or a method whose predetermined priority order is high may be preferentially selected.

The second decision method is a method of deciding a WPT method based on a WPT method supported by another power receiving apparatus existing within a communication range. That is, a communication unit 213 of the power receiving apparatus 103 communicates with each of other power transmission apparatuses existing within the communication range wider than a power transmission range 102 of the power transmitting apparatus 101, thereby acquiring information indicating a WPT method supported by the power receiving apparatus. If there is a WPT method which is not supported by other power receiving apparatuses within the communication range, the power reception control unit 214 decides the WPT method as a WPT method to be used for power transmission to the power receiving apparatus 103.

If, for example, the power receiving apparatus 103 within the power transmission range supports the first and second WPT methods, two other power receiving apparatuses within the communication range of the power receiving apparatus 103 support not the second WPT method but the first WPT method, the power reception control unit 214 makes a decision as follows. That is, the power reception control unit 214 of the power receiving apparatus 103 decides to make the power transmitting apparatus 101 transmit power by the second WPT method.

As described above, the communication unit 213 of the power receiving apparatus 103 acquires information about the WPT method supported by other power receiving apparatuses existing within the communication range wider than the power transmission range of the power transmitting apparatus 101 by communicating with the other power receiving apparatuses. Based on the information about the WPT method supported by the other power receiving apparatuses, the power reception control unit 214 decides a WPT method to be used by the power transmitting apparatus 101. This can improve the possibility that when another power receiving apparatus requests power transmission during power transmission from the power transmitting apparatus 101 to the power receiving apparatus 103, the power transmitting apparatus 101 can also transmit power to the other power receiving apparatus.

Note that one of the two power receiving apparatuses existing within the communication range of the power receiving apparatus 103 supports only the first WPT method and the other supports only the second WPT method, the power reception control unit 214 decides a WPT method to be used for power transmission to the power receiving apparatus 103 as follows. That is, the power reception control unit 214 decides to make the power transmitting apparatus 101 transmit power by the WPT method supported by the power receiving apparatus 103 whose remaining battery amount is larger among the two power receiving apparatuses. The present invention, however, is not limited to this. For example, it is possible to make the power transmitting apparatus 101 transmit power by the WPT method whose remaining amount of transmissible power is larger among the first and second WPT methods.

The third decision method is a method of deciding a WPT method based on history information. A storage unit 216 of the power receiving apparatus 103 stores, in association with each other, identification information of the power transmitting apparatus 101 and a WPT method used by the power transmitting apparatus 101 in the past. Based on the identification information of the power transmitting apparatus 101, the power reception control unit 214 decides a WPT method to be used for power transmission. That is, the power reception control unit 214 decides a WPT method to be used by the power transmitting apparatus 101 using history information about a WPT method used for power transmission to the power receiving apparatus 103. Even with this processing, it is possible to decide a WPT method to be used for power transmission from the plurality of WPT methods. Note that when the power transmitting apparatus 101 is already transmitting power to another power receiving apparatus 103, it may be impossible to transmit power by the WPT method decided based on the history information. In this case, the power transmission control unit 201 decides to transmit power to the power receiving apparatus 103 by a WPT method whose remaining amount of transmissible power is larger among the remaining WPT methods.

The fourth decision method is a method of deciding a WPT method based on the position of the power receiving apparatus 103 within the power transmission range. A mark 104 shown in FIG. 1 is used to help arrange the power receiving apparatus 103 which desires power transmission by the first WPT method. If, for example, the user wants to charge the power receiving apparatus 103 by the first WPT method, he/she can charge the power receiving apparatus 103 by the first WPT method by placing the power receiving apparatus 103 near the mark 104.

In this example, the detection unit 209 of the power transmitting apparatus 101 detects the position of the power receiving apparatus 103 existing within the power transmission range, and notifies the power receiving apparatus 103 of position information. The power reception control unit 214 of the power receiving apparatus 103 decides a WPT method to be used by the power transmitting apparatus 101 for power transmission based on the position information. This enables the user to designate a WPT method depending on a position at which the power receiving apparatus 103 is placed. Note that FIG. 1 shows only the mark 104 indicating a position where power is transmitted by the first WPT method. In addition, a mark indicating a position for the second WPT method and a mark indicating a position for the third WPT method may be provided.

The fifth decision method is a decision method in which the user directly designates a WPT method. That is, the user designates a WPT method via a UI 215 of the power receiving apparatus 103. The power reception control unit 214 decides a WPT method to be used by the power transmitting apparatus 101 for power transmission based on the contents designated by the user. For example, the user can designate a WPT method using the UI 215 in S608 of FIG. 6. Alternatively, for example, the user may designate the priority order of each WPT method via the UI 215. The user may be able to designate a policy of deciding a WPT method (for example, a method whose remaining amount of transmissible power is larger is prioritized or a WPT method is decided based on the position of the power receiving apparatus 103) via the UI 215.

The sixth decision method is a method of deciding a WPT method based on a WPT method currently in progress. For example, when a power receiving apparatus 103-2 is charged while the power transmitting apparatus 101 transmits power to a power receiving apparatus 103-1 by the second WPT method, a power reception control unit 214 of the power receiving apparatus 103-2 decides the second WPT method as a WPT method to be used for power transmission to the power receiving apparatus 103-2. In this example, the second WPT method is a WPT method being used for power transmission to the power receiving apparatus 103-1. That is, the power reception control unit 214 decides, as a WPT method to be used for power transmission to the power receiving apparatus 103-2, the same WPT method as that in progress for power transmission to the other power receiving apparatus 103-1. This can reduce the number of power transmitting units 205 to be operated and that of power transmitting antennas 206 to be operated as much as possible. Note that in the above example, when it is impossible to use the second WPT method for power transmission to the power receiving apparatus 103-2, the power reception control unit 214 may decide to transmit power by, for example, a WPT method whose remaining amount of transmissible power is larger among the remaining WPT methods.

As described above, the power reception control unit 214 decides a WPT method to be used for power transmission to the power receiving apparatus 103 using one of the above decision methods. Note that the WPT method decided by the power receiving apparatus using one of the first to sixth decision methods may be displayed on a display unit (not shown), and the user may finally decide the WPT method.

Referring back to FIG. 8, when one WPT method is decided in step S804, the power reception control unit 214 negotiates with the power transmitting apparatus 101 for wireless power transmission while notifying the power transmitting apparatus 101 of the WPT method (step S805). In the negotiation according to this embodiment, the power transmitting apparatus 101 acquires control information such as the device type, charging status (0 to 100%), requested power amount (for example, 5 W), and current operation mode (communication or sleep mode) of the power receiving apparatus 103. Based on the acquired various kinds of information about the power receiving apparatus 103, the power transmission control unit 201 of the power transmitting apparatus 101 decides parameters such as a driving frequency and a current value or voltage value to be applied to the power transmitting antenna 206.

After the start of the negotiation, the power reception control unit 214 determines whether the negotiation has succeeded (step S806). Whether the negotiation has succeeded is determined depending on whether the power transmitting apparatus 101 can execute power transmission appropriate for the various kinds of information (the charging status and the requested power amount) about the power receiving apparatus 103 acquired by the power transmitting apparatus 101. That is, the power receiving apparatus 103 can determine whether the negotiation has succeeded by receiving a message indicating the success or failure of the negotiation from the power transmitting apparatus 101. If the power reception control unit 214 determines that the negotiation has succeeded (YES in step S806), it starts to receive power transmitted by the power transmitting unit 205 in step S808 (a power reception procedure).

On the other hand, if the power reception control unit 214 determines that the negotiation has failed (NO in step S806), it determines whether there is another candidate of a WPT method (step S807). If it is determined that there is another candidate of a WPT method (YES in step S807), a negotiation is performed by another WPT method (step S805). If it is determined that there is no other candidate of a WPT method (NO in step S807), the processing shown in FIG. 8 is terminated.

The power reception control unit 214 determines whether to end power reception every time a predetermined time elapses after the start of power reception (step S809). A power reception end condition can include, for example, the full charge state of the battery of the power receiving apparatus 103, an internal error of the power receiving apparatus 103, or an error in current value or voltage value in the power transmitting antenna 206. Alternatively, a power reception end condition can be reception of a power transmission end notification from the power transmitting apparatus 101. If the power reception control unit 214 determines to end power reception in step S809, it transmits a power reception end notification to the power transmitting apparatus 101, as needed, thereby terminating the processing of FIG. 8. On the other hand, if the power reception control unit 214 determines not to end power reception in step S809, the process returns to step S808 to continue power reception.

Note that according to the sequence chart shown in FIG. 6, the power transmitting apparatus 101 inquires of the power receiving apparatus 103 about the first, second, and third WPT methods, and the power receiving apparatus 103 specifies the WPT methods supported by the power transmitting apparatus 101. The present invention, however, is not limited to this. The power transmitting apparatus 101 may directly inquire of the power receiving apparatus 103 about the WPT method supported by the power receiving apparatus 103.

FIG. 10 is a sequence chart obtained by changing the sequence chart shown in FIG. 6 so that the power transmitting apparatus 101 directly inquires of the power receiving apparatus 103 about the WPT method supported by the power receiving apparatus 103. Referring to FIG. 10, the power transmitting apparatus 101 inquires of the power receiving apparatus 103 about the WPT method supported by the power receiving apparatus 103 (S1002). Upon receiving the inquiry, the power receiving apparatus 103 notifies the power transmitting apparatus 101 of the supported WPT method (S1003). The power transmitting apparatus 101 specifies the WPT method supported by the power receiving apparatus 103 based on the contents of the notification. If the power transmitting apparatus 101 can receive no notification from the power receiving apparatus 103, it may inquire again a predetermined number of times. If the power transmitting apparatus 101 can receive no notification from the power receiving apparatus 103 even after inquiring the predetermined number of times, the processing may be terminated, and an error may be displayed on a display (not shown) or the like. An operation in S1004 and subsequent operations are completely the same as those described with reference to the sequence chart shown in FIG. 6.

As described above, in a wireless power transmission system according to this embodiment, the power receiving apparatus 103 which receives power from the power transmitting apparatus 101 supporting the plurality of wireless power transmission methods (WPT methods) decides a WPT method to be used for power transmission. This can improve the efficiency of wireless power transmission in the system supporting the plurality of wireless power transmission methods.

<Third Embodiment>

The third embodiment of the present invention will be described by mainly focusing attention on the difference from the first and second embodiments. In the first and second embodiments, a description has been provided up to an operation of performing power transmission end processing and power reception end processing after a power transmission end notification is transmitted by the power transmitting apparatus 101 or a power reception end notification is transmitted by the power receiving apparatus 103. In this embodiment, an operation of performing power transmission end processing for a power receiving apparatus 103 and then transmitting power again to another power receiving apparatus 103 when a plurality of power receiving apparatuses 103 are placed within the power transmission range of a power transmitting apparatus 101 will be described. FIG. 11 is a sequence chart when the power transmitting apparatus decides a WPT method, similarly to the sequence chart shown in FIG. 3. FIG. 12 is a sequence chart when the power receiving apparatus decides a WPT method, similarly to the sequence chart shown in FIG. 6. The operation of the power transmitting apparatus 101 and power receiving apparatuses 103-1 and 103-2 will be described with reference to FIG. 11.

The power transmitting apparatus 101 is transmitting power to the power receiving apparatus 103-1 by the second WPT method (S1101). Since the battery of the power receiving apparatus 103-1 enters the full charge state, a power transmission end notification or power reception end notification is transmitted (S1102), the power transmitting apparatus 101 performs power transmission end processing (S1103), and the power receiving apparatus 103-1 performs power reception end processing (S1104). After that, after a predetermined time elapses (S1105), the power transmitting apparatus 101 determines again whether the power receiving apparatus 103 exists within the power transmission range (S1106). If it is determined that the power receiving apparatus 103-2 exists within the power transmission range, the power transmitting apparatus 101 transmits, to the power receiving apparatus 103-2, a signal (second inquiry signal) complying with the communication method and format of the second WPT method as the WPT method by which power was transmitted to the power receiving apparatus 103-1 (S1107). If the power receiving apparatus 103-2 supports the second WPT method, it transmits a response (second response) to the second inquiry signal to the power transmitting apparatus 101 (S1108). The power receiving apparatus 103-2 which does not support the second WPT method transmits no response (or transmits an error message) even if it receives the second inquiry signal.

The power transmitting apparatus 101 transmits a signal (first inquiry signal) complying with the communication method and format of the first WPT method to the power receiving apparatus 103-2 (S1109). If the power receiving apparatus 103-2 supports the first WPT method, it transmits a response (first response) to the first inquiry signal (S1110). The power receiving apparatus 103-2 which does not support the first WPT method transmits no response (or transmits an error message) even if it receives the first inquiry signal.

The power transmitting apparatus 101 transmits a signal (third inquiry signal) complying with the communication method and format of the third WPT method to the power receiving apparatus 103-2 (S1111). If the power receiving apparatus 103-2 supports the third WPT method, it transmits a response (third response) to the third inquiry signal (S1112). The power receiving apparatus 103-2 which does not support the third WPT method transmits no response (or transmits an error message) even if it receives the third inquiry signal. For example, since the power receiving apparatus 103 shown in FIG. 2 does not support the third WPT method, even if it receives the third inquiry signal from the power transmitting apparatus 101, it transmits no response (or transmits an error message).

Note that the power transmitting apparatus 101 finishes transmission of inquiry signals about all the WPT methods supported by the power transmitting apparatus 101 within a predetermined time after the second inquiry signal is transmitted. Since the power transmitting apparatus 101 of this embodiment supports the three WPT methods, it transmits three inquiry signals within the predetermined time. Note that in this embodiment, the power transmitting apparatus 101 first inquires about the second WPT method as the WPT method by which it transmits power to the power receiving apparatus 103-1. Similarly to the first embodiment, however, the power transmitting apparatus 101 may first inquire about the first WPT method. An operation in S1113 and subsequent operations are completely the same as those in the first embodiment.

As for the operation of the power transmitting apparatus 101 and the power receiving apparatuses 103-1 and 103-2 according to the sequence chart shown in FIG. 12, operations in S1201 to S1212 are completely the same as those in the sequence chart shown in FIG. 11. An operation in S1213 and subsequent operations are completely the same as those in the second embodiment. Note that in this embodiment, processing after power transmission ends since the battery of the power receiving apparatus 103-1 enters the full charge state has been explained. Even if, however, power transmission ends since the power receiving apparatus 103-1 is removed from the power transmitting apparatus 101 before the battery of the power receiving apparatus 103-1 enters the full charge state, the same operation can be performed to transmit power to the power receiving apparatus 103-2.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-206810, filed Oct. 1, 2013 which is hereby incorporated by reference herein in its entirety.

What is claimed is:

1. A power transmitting apparatus supporting a plurality of wireless power transmission methods, comprising:
   a communicator for communicating with a power receiving apparatus;
   at least one power transmission coil to be used for wireless power transmission to the power receiving apparatus;
   a controller for:
      (i) determining, based on information received from the power receiving apparatus, whether the power receiving apparatus supports a first wireless power transmission method in which a first value is defined as an upper limit value of a power transmission amount, the first value being higher than a second value that is defined as an upper limit value of a power transmission amount for a second wireless power transmission method;
      (ii) deciding, based on a result of the determining, a wireless power transmission method to be used for wireless power transmission to the power receiving apparatus among a plurality of wireless power transmission methods including at least the first wireless power transmission method and the second wireless power transmission method, wherein the controller decides to transmit power to the power receiving apparatus according to the first wireless power transmission method if the controller determines that the power receiving apparatus supports both of the first and second wireless power transmission methods; and
      (iii) performing negotiation, by using a communication protocol according to the decided wireless power transmission method, with the power receiving apparatus to determine parameters for the wireless power transmission according to the decided wireless power transmission method; and
   a power transmitter for, by using the at least one power transmission coil, performing the wireless power transmission to the power receiving apparatus according to the wireless power transmission method decided by said controller, wherein the wireless power transmission according to the first wireless power transmission method and the wireless power transmission according to the second wireless power transmission method are performed by a same power transmission coil.

2. The apparatus according to claim 1, wherein the wireless power transmission by the first wireless power transmission method is controlled by a first communication protocol, and the wireless power transmission by the second wireless power transmission method is controlled by a second communication protocol whose communicable distance is longer than that of the first communication protocol.

3. The apparatus according to claim 1, wherein said controller decides to transmit power to the power receiving apparatus by the second wireless power transmission method by which a larger amount of power is transmissible than the first wireless power transmission method in a case where the communicator receives information identifying both of the first and second wireless power transmission methods as the wireless power transmission methods that are supported by the power receiving apparatus.

4. The apparatus according to claim 1, wherein said communicator further receives second information for identifying a wireless power transmission method supported by another power receiving apparatus other than the power receiving apparatus,
wherein said controller decides, based on both of the information and the second information received by said communicator, a wireless power transmission method to be used for power transmission to the power receiving apparatus.

5. The apparatus according to claim 1, wherein said controller decides, based on history information about a wireless power transmission method used for power transmission to the power receiving apparatus in the past, a wireless power transmission method to be used for power transmission to the power receiving apparatus.

6. The apparatus according to claim 1, further comprising a detector for detecting a position of the power receiving apparatus existing within a power transmission range of said power transmitting unit,
wherein based on the position of the power receiving apparatus detected by said detector, said controller decides a wireless power transmission method to be used for power transmission to the power receiving apparatus.

7. The apparatus according to claim 1, wherein based on both of (i) a wireless power transmission method already used for power transmission to another power receiving apparatus and (ii) the one or more wireless power transmission methods identified by the information received by said communicator, said controller decides a wireless power transmission method to be used for power transmission to the power receiving apparatus.

8. The apparatus according to claim 1, wherein based on both of (i) power transmission efficiency and (ii) the one or more wireless power transmission methods identified by the information received by said communicator, said controller decides a wireless power transmission method to be used for power transmission to the power receiving apparatus.

9. The apparatus according to claim 1, wherein based on both of (i) designation of a user and (ii) the one or more wireless power transmission methods identified by the information received by said communicator, said controller decides a wireless power transmission method to be used for power transmission to the power receiving apparatus.

10. The apparatus according to claim 1, wherein after said power transmitter ends the wireless power transmission to the power receiving apparatus, processes by said communicator, said controller, and said power transmitter are executed for a second power receiving apparatus different from the power receiving apparatus.

11. A control method for a power transmitting apparatus which comprises at least one power transmission coil to be used for wireless power transmission to a power receiving apparatus and which supports a plurality of wireless power transmission methods, the control method comprising:
receiving information from the power receiving apparatus;
determining, based on information received from the power receiving apparatus, whether the power receiving apparatus supports a first wireless power transmission method in which a first value is defined as an upper limit value of a power transmission amount, the first value being higher than a second value that is defined as an upper limit value of a power transmission amount for a second wireless power transmission method;
deciding, based on a result of the determining a wireless power transmission method to be used for wireless power transmission to the power receiving apparatus among a plurality of wireless power transmission methods including at least the first wireless power transmission method and the second wireless power transmission method, wherein it is decided to transmit power to the power receiving apparatus according to the first wireless power transmission method if it is determined that the power receiving apparatus supports both of the first and second wireless power transmission methods;
performing negotiation, by using a communication protocol according to the decided wireless power transmission method, with the power receiving apparatus to determine parameters for the wireless power transmission according to the decided wireless power transmission method; and
transmitting power wirelessly, by using the at least one power transmission coil, to the power receiving apparatus according to the decided wireless power transmission method, wherein the wireless power transmission according to the first wireless power transmission method and the wireless power transmission according to the second wireless power transmission method are performed by a same power transmission coil.

12. A non-transitory computer-readable storage medium storing a computer program for controlling a computer to execute a control method for a power transmitting apparatus which comprises at least one power transmission coil to be used for wireless power transmission to a power receiving apparatus and which supports a plurality of wireless power transmission methods, the program comprising code for executing:
receiving information from the power receiving apparatus;
determining, based on information received from the power receiving apparatus, whether the power receiving apparatus supports a first wireless power transmission method in which a first value is defined as an upper limit value of a power transmission amount, the first value being higher than a second value that is defined as an upper limit value of a power transmission amount for a second wireless power transmission method;
deciding, based on a result of the determining, a wireless power transmission method to be used for wireless power transmission to the power receiving apparatus among a plurality of wireless power transmission methods including at least the first wireless power transmission method and the second wireless power transmission method, wherein it is decided to transmit power to the power receiving apparatus according to the first wireless power transmission method if it is determined that the power receiving apparatus supports both of the first and second wireless power transmission methods;

performing negotiation, by using a communication protocol according to the decided wireless power transmission method, with the power receiving apparatus to determine parameters for the wireless power transmission according to the decided wireless power transmission method; and transmitting power wirelessly, by using the at least one power transmission coil, to the power receiving apparatus according to the decided wireless power transmission method, wherein the wireless power transmission according to the first wireless power transmission method and the wireless power transmission according to the second wireless power transmission method are performed by a same power transmission coil.

13. The apparatus according to claim 1, wherein said power transmitter comprises a first antenna for wireless power transmission by the first wireless power transmission method and a second antenna for wireless power transmission by the second wireless power transmission method.

14. The apparatus according to claim 1, wherein a format of a message sent by the controller to the power receiving apparatus for negotiation of the first power transmission method is different from a format of a message sent by the controller to the power receiving apparatus for negotiation of the second power transmission method.

15. The apparatus according to claim 1, wherein the controller performs negotiation with the power receiving apparatus for determining parameters for wireless power transmission, by using a communication protocol according to the decided power transmission method.

16. The apparatus according to claim 1, wherein the communicator transmits, to the power receiving apparatus, a first inquiry message according to the first communication protocol and a second inquiry message according to the second communication protocol, and the communicator receives a response to at least one of the first and second inquiry messages as information used for determining whether the power receiving apparatus supports each of the first and second wireless power transmission methods.

17. The apparatus according to claim 1, wherein the controller decides to transmit power to the power receiving apparatus by the second wireless power transmission method in a case where the controller determines, based on the information received from the power receiving apparatus, that the power receiving apparatus does not support the first wireless power transmission method and does support the second wireless power transmission method.

* * * * *